United States Patent [19]
Fielder et al.

[11] Patent Number: 5,995,624
[45] Date of Patent: Nov. 30, 1999

[54] BILATERAL AUTHENTICATION AND INFORMATION ENCRYPTION TOKEN SYSTEM AND METHOD

[75] Inventors: Guy L Fielder, Houston; Paul N Alito, Austin, both of Tex.

[73] Assignee: The Pacid Group, Austin, Tex.

[21] Appl. No.: 08/815,403

[22] Filed: Mar. 10, 1997

[51] Int. Cl.$^6$ ........................................ H04L 9/00
[52] U.S. Cl. .................... 380/25; 380/9; 380/21; 380/23; 380/29; 380/30; 380/49; 380/50; 395/186; 395/187.01
[58] Field of Search ............... 380/4, 9, 21, 23, 380/25, 28, 49, 50, 59, 29, 30; 395/186, 187.01

[56] References Cited

U.S. PATENT DOCUMENTS

| | | | |
|---|---|---|---|
| 5,138,712 | 8/1992 | Corbin | 380/9 X |
| 5,323,465 | 6/1994 | Avarne | 380/23 |
| 5,546,463 | 8/1996 | Caputo et al. | 380/25 |
| 5,588,059 | 12/1996 | Chandos et al. | 380/21 |

*Primary Examiner*—Bernarr E. Gregory
*Attorney, Agent, or Firm*—Gerald E. Lester

[57] ABSTRACT

An authentication and information encryption system and method which uses a token system for increased security in accommodating bilateral encrypted communications between an originating system and an answering system, with each system without synchronization independently generating a message digest through use of an encryption key generator which employs bit-shuffling, many-to-few bit mapping, and secure hash processing to forestall attempts to discover the secret inputs to the generator, or the system password, encryption key, or change value outputs extracted from the message digest, through cryptographic analysis or brute force trial-and-error attacks, and with each system using the passwords, encryption key and change value during only a single system connection before using the change value to update one of the secret inputs to the key generator to provide new password, encryption key and change value parameters having no predictable relationship to their previous counterparts, and with each system accommodating plural authentication cycles to verify the originating system, the answering system, the token system, and the pairing of the token system with either the originating system, the answering system, or both, all without public exposure of the secret inputs, encryption key or change value. Further, a deterministic, non-predictable, pseudo-random, and symmetric encryption key is generated, used during only a single system connection, and then destroyed. Thus, the need for key directories is obviated. Lastly, the token system ID, the originating system ID, and the answering system ID may be altered by a component of the message digest upon completion of a system connection to significantly reduce the risk of playback impersonations.

46 Claims, 20 Drawing Sheets

BILATERAL AUTHENTICATION AND INFORMATION ENCRYPTION TOKEN SYSTEM AND METHOD

RELATED APPLICATIONS

Copending applications filed on the same date and having same inventors are "File Encryption Method And System", Ser. No. 09/221,521 filed on Dec. 28, 1998, as a continuation claiming priority date of U.S. application Ser. No. 08/813,459 filed on Mar. 10, 1997; "Bilateral Authentication And Encryption System", Ser. No. 09/219,967 filed on Dec. 23, 1998, as a continuation claiming priority date of U.S. application Ser. No. 08/813,457 filed on Mar. 10, 1997, now abandoned; and "Secure Deterministic Encryption Key Generator System And Method", Ser. No. 09/221,421 filed on Dec. 28, 1998, as a continuation claiming priority date of U.S. application Ser. No. 08/813,992 filed on Mar. 10, 1997, now abandoned.

BACKGROUND OF THE INVENTION

When sensitive information is exchanged between transceiving stations, the information can be intercepted by an unauthorized party as the information travels over a communication medium between the stations, can inadvertently be received by an unauthorized station, or can come into the possession of an unauthorized person even though the information was received at the intended destination.

Another scenario occurs when a user requests access to sensitive data files stored in a computer system which may be in near proximity or at a remote station. In order to protect the files from unauthorized disclosure, the computer system must have the capacity to authenticate the user, verify that the user is authorized to receive the files, and protect the files from unauthorized access when they are electronically transferred to the user.

The most widely accepted method of information protection over networks is the use of encryption, where the sending and receiving parties must share an encryption key to encrypt and decrypt the information being exchanged. In such systems, authentication is typically performed through cleartext exchanges, and the encryption keys that are used are changed infrequently as person-to-person exchanges are the only means to ensure that the encryption key can be shared without risking public exposure. As a result, valuable information and time is made available to an attacker who desires to discover the encryption key and gain access to all encrypted information which is exchanged over the networks.

Prior authentication and encryption systems are disclosed in U.S. Pat. Nos. 5,060,263; 5,065,429; 5,068,894; 5,153,919; 5,355,413; 5,361,062; 5,474,758; and 5,495,533. U.S. Pat. No. 5,060,263 employs a reversible encryption algorithm, conducts all exchanges between the host and client in cleartext, and provides only unilateral authentication. U.S. Pat. No. 5,065,429 provides only unilateral authentication, and stores its encryption keys on the storage medium where they would be accessible to any attacker reading the medium. U.S. Pat. No. 5,068,894 employs a reversible encryption algorithm, uses an encryption key that is never changed, and makes both cleartext challenges and encrypted responses available to an attacker. U.S. Pat. No. 5,153,919 provides useful cleartext information for an attacker in exchanges between stations, uses weak encryption algorithms to avoid latency problems, and does not provide for secure activation of the token as anyone who possesses it may use it. U.S. Pat. No. 5,355,413 encrypts a random challenge, but does not encrypt information exchanged between host and client. U.S. Pat. No. 5,361,062 exchanges information between host and client in cleartext, uses a reversible encryption algorithm, provides only unilateral authentication, triggers encryption iterations as a function of time which contributes to computer overhead and system latency, and requires a resynchronization protocol to keep token and host in sync. U.S. Pat. No. 5,474,758 provides only unilateral authentication, and depends upon the users ability to hide the storage of his certificate of authenticity. U.S. Pat. No. 5,495,533 provides only unilateral authentication, incurs a high network overhead contributing to latency, and depends upon a key directory which is susceptible to attacker intrusions.

Additional prior authentication systems are disclosed in U.S. Pat. Nos. 5,233,655; 5,367,572; 5,421,006; and 5,481,611. U.S. Pat. No. 5,233,655 provides only unilateral authentication, and does not provide any encryption of information that is being exchanged. U.S. Pat. No. 5,367,572 provides only unilateral authentication, requires a resynchronization protocol to keep the host and client in sync, and transmits all information exchanges in cleartext. U.S. Pat. No. 5,421,006 provides only unilateral authentication, and operates in a multiprocessing environment which contributes substantially to CPU overhead and thus system latency. U.S. Pat. No. 5,481,611 provides only unilateral authentication, and conducts all information exchanges in cleartext. U.S. Pat. No. 5,309,516 requires that a key directory be stored.

None of the above prior art references disclose the use of dual many-to-few bit mapping in generating a deterministic, non-predictable, and symmetric encryption key as used in the present invention.

In addition to the above disclosures, the use of secure hash algorithms (SHA) is disclosed in FIPS Pub. 180-1, Secure Hash Standard (Apr. 17, 1995); and token system security requirements are described in FIPS Pub. 140-1, Security Requirements For Cryptographic Modules (Jan. 11, 1994).

Further, there are three known variations of the token system which are commercially available, but which were not selected for use in the preferred embodiment of the present invention because each uses a reversible DES algorithm: the SecurID Card from Security Dynamics Technologies, Inc. of Cambridge, Mass.; the SafeWord DES Card from Enigma Logic, Inc. of Concord, Calif.; and the Secure Net Key Card from Digital Pathways of Mountain View, Calif. None of the above token systems have digital interfaces. Although each requires PIN activation, they are limited to 8 digit displays.

The present invention provides a combination of authentication and encryption in which parameters including system passwords, encryption keys, and change values which are used to produce new, pseudo-random system passwords and encryption keys, are used during only a single system connection before being replaced with new parameters having no known relationship with their previous counterparts, and both the originating system and the answering system in a network exchange independently generated passwords through use of an encryption key generator which employs bit-shuffling, many-to-few bit mapping and secure hash processing to produce such parameters in a manner which is highly resistant to any attempt to discover the secret inputs to the encryption key generator through cryptographic analysis or brute force trial-and-error attacks. Further, the hand shake protocol between the originating system and the answering system requires that only system identifiers be exchanged over a network in cleartext, and protects the static and dynamic secret encryption key generator inputs, and the system password, encryption key, and change value outputs from exposure. A tamper-resistant security module or token system is used with either or both the originating system and the answering system to provide additional security. That is, all authentication, password generation, and encryption key generation functions for the originating system are performed within the token for greater security. A further layer of security may be provided by altering the token and system IDs upon completion of a system connection between the originating system and the answering system. Susceptibility to playback impersonations thereby is significantly reduced.

SUMMARY OF THE INVENTION

In accordance with the present invention, bilateral authentication of an originating system, an answering system, and an originating system/token system pair occurs, and the encryption of information to be exchanged between the originating system and the answering system occurs, without exposing data other than system identifiers.

In one aspect of the invention, a static secret and a dynamic secret initially are known by the originating system and the answering system, but are never revealed by one system to the other. The systems independently use such secrets to generate message digests from which system passwords, a secret session encryption key, and a change value are extracted, and information encrypted with the secret session encryption key is exchanged between the systems without need for the secret session encryption key or the change value to be exposed in any form, or for the system passwords to be exposed in other than encrypted form.

In another aspect of the invention, an encryption key generator is used independently by each of the originating system and the answering system by which a static secret and a dynamic secret are initially known in secret, and thereafter used without exposure by one system to the other as inputs to the encryption key generator, which employs a mathematical or logic function to shuffle input bits and perform a many-to-few bit mapping in which the input having the lesser bit length is repeatedly wrapped into the input having the larger bit length until all bits of the larger bit length input have been processed, and the pseudo-random result so obtained is applied as an input to a secure hash function which performs a second many-to-few bit mapping to produce a pseudo-random message digest from which an originating system password, an answering system password, a secret session encryption key, and a change value are extracted without exposure.

In a further aspect of the invention, the dynamic secret is altered by a prime constant and the change value each time the authentications for a system connection are completed, and the authentications occur after each system connection to ensure that any originating system password, any answering system password, any secret session encryption key, and any change value will be used by the originating system and the answering system during only a single system connection.

In yet a further aspect of the invention, the token ID, the answering system ID, and the originating system ID may be altered by any component of the pseudo-random message digest upon completion of a system connection to significantly reduce risk of playback impersonations.

In a still further aspect of the invention, a tamper resistant security module or token system is used with one or more of the originating system and the answering system, and the static and dynamic secrets are held within the token system, and the encryption key generator, system password authentication, and dynamic secret alteration functions are all conducted within the token system rather than the system with which the token system is used for enhanced security.

In yet further aspects of the invention, encryption keys are generated without need for key directories, the originating system and the answering system operate independently without need for a synchronization protocol, and an encryption algorithm highly resistant to cryptographic analysis and brute force trial-and-error attacks is used which does not create system overhead or latency problems in system operation.

In yet another aspect of the invention, the binary length of the dynamic secret may be different from that of the static secret.

In still another aspect of the invention, the secret session encryption key is a deterministic, non-predictable, pseudo-random, and symmetric encryption key which is changed after each system connection.

An additional security feature is that both the originating system and the answering system have the static and dynamic secrets, and create a pseudo-random message digest in advance of requesting access. Thus, there is no need for a challenge relay over the communication link which would reveal information which might benefit an attacker.

BRIEF DESCRIPTION OF THE DRAWINGS

Additional objects, features and advantages of the present invention will become apparent from the following detailed description when read in conjunction with the accompanying drawings in which.

DESCRIPTION OF PREFERRED EMBODIMENTS

Preferred embodiments of the invention will now be described with reference to the accompanying drawings.

In the descriptions which follow, the terms "random", "pseudo-random", "connection" and "session" have the following meanings:

"Random" means a result which is unpredictable and non-repeating.

"Pseudo-random" means a result which is deterministic, but which appears to be random to an observer who has no access to or knowledge of the secrets producing the result.

"Connection" means the establishment of a communication link between an originating system and an answering system which lasts for the duration of one or more sessions.

"Session" means one or more exchanges of information between an originating system and an answering system to accomplish a task. There can be several sessions during a system connection. In accordance with the invention, keys and passwords are automatically changed after each system connection. Optionally, the key and/or passwords can be changed after each session.

Figure 1:
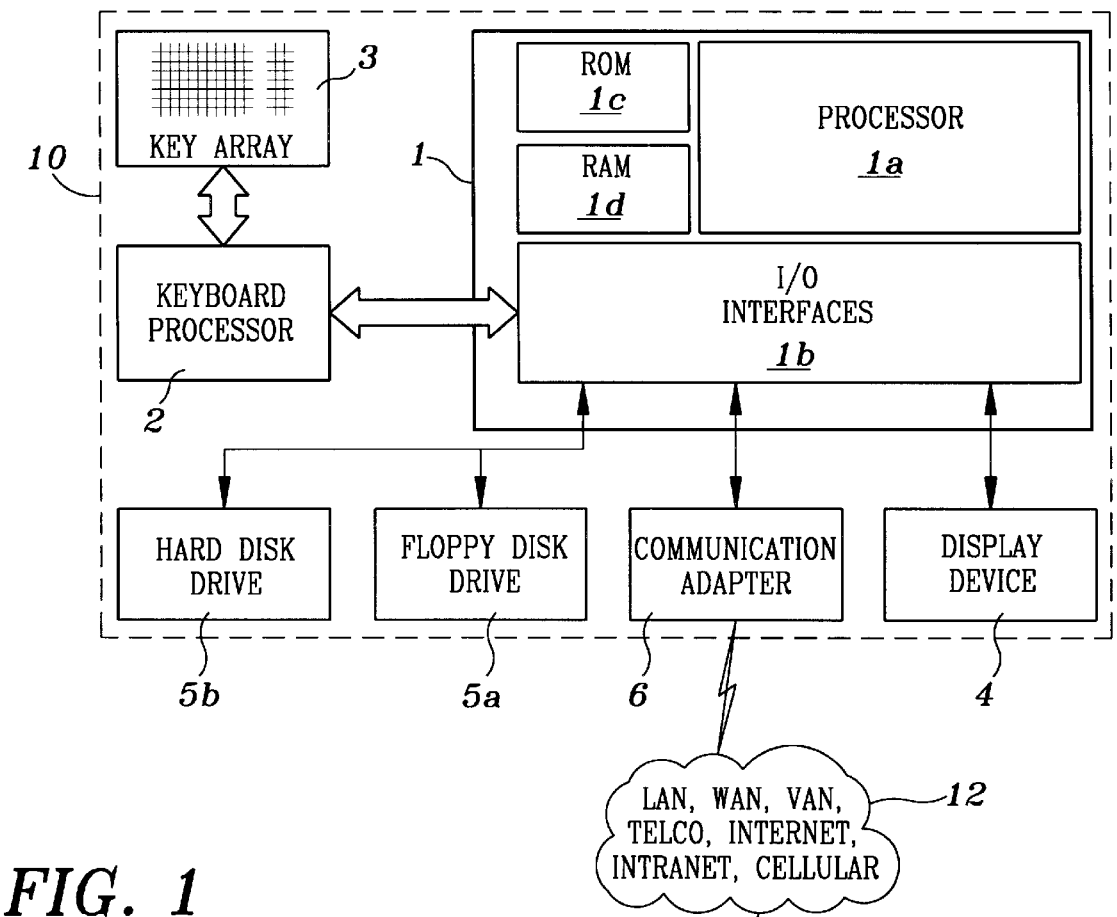
FIG. 1 is a functional block diagram of two computer systems communicating by way of a communications medium.
Figure 1:
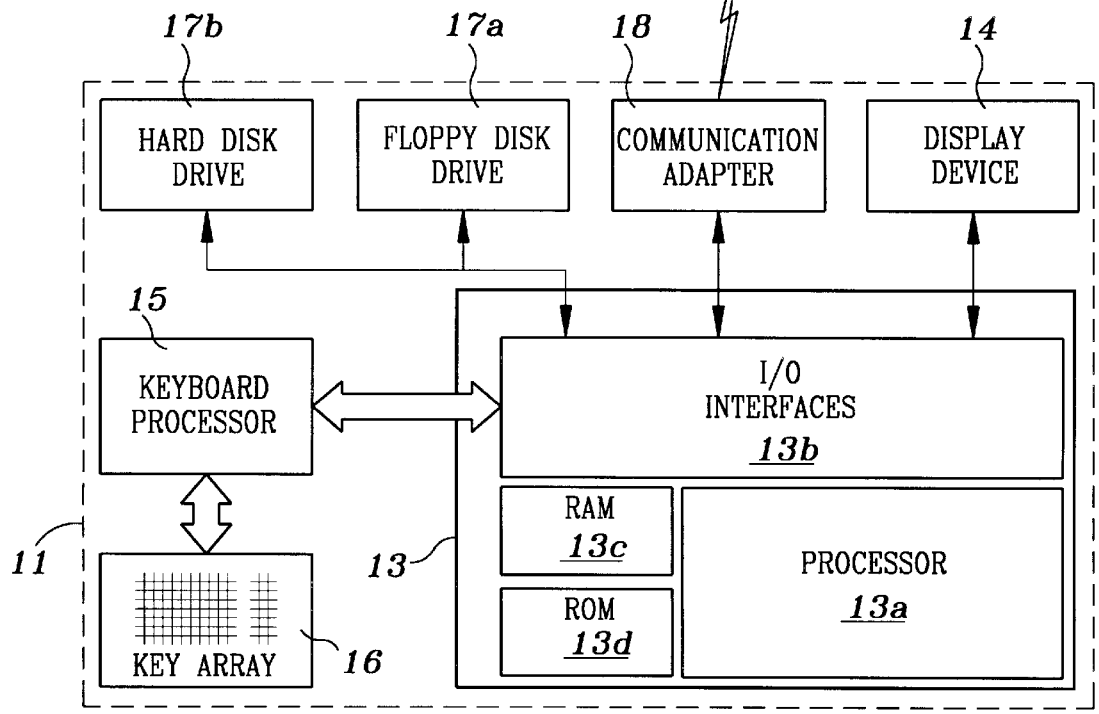

Referring to FIG. 1, a first computer system 10 is shown which communicates to a second computer system 11 by way of a communication link 12. The communication link may be a LAN (Local Area Network), WAN (Wide Area Network), VAN (Value Added Network), TELCO (Telephone Company switching network), the Internet, a local intranet, or an air link such as a cellular phone connection or other radio frequency transceiver interface.

The computer system 10 includes a central processing unit (CPU) 1 with I/O interfaces 1b leading to a keyboard processor 2 with a key matrix interface array 3. The CPU 1 further includes a processor 1a, a ROM 1c, and a RAM 1d. The computer system 10 in addition is comprised of a floppy disk drive 5a, a hard disk drive 5b, a communication adapter 6, and a display device 4, each of which is in electrical communication with I/O interfaces 1b.

The computer system 11 includes a CPU 13 that is comprised of a processor 13a, I/O interfaces 13b, a RAM 13c, and a ROM 13d. The I/O interfaces 13b are in electrical communication with a display device 14, a keyboard processor 15 having a key matrix interface array 16, a floppy disk drive 17a, a hard disk drive 17b, and a communication adapter 18.

Processor 1a is used to execute the software algorithms and logic flows to perform the operation of the security system program. ROM 1c is necessary to get computer system 10 booted and operating (contains the code necessary to access the boot-sector). Key array 3 and display device 4 are used to support inter-operation between the computer and user. RAM 1d is used as a scratch pad, stack, or temporary storage of the values which are used by the program or operated on by the program. Hard disk drive 5b is non-volatile memory for storing system ID's, shared secrets, and the executable code for this program. Floppy disk drive 5a can be used as removable non-volatile memory for storing system ID's and shared secrets.

The communication link 12 is in communication with communication adapter 6 of computer system 10, and with communication adapter 18 of computer system 11.

In the operation of the invention as explained in detail below, system IDs, a static secret and a dynamic secret are stored on hard disk drive 5b of computer system 10, and are moved to RAM 1d by processor 1a when the originating and answering stations are being authenticated. Further, system passwords and the secret session encryption key are stored in the RAM 1d upon being generated during an authentication process. After each authentication and encryption information exchange, the RAM 1d is either overwritten by data generated during a next occurring session, or erased at the end of the current system connection, and the new dynamic secret is written to the hard disk drive 5b.

In like manner in computer system 11, the system IDs, the static secret, and the dynamic secret are stored on hard disk drive 17b, and are moved to RAM 13c by processor 13a when the originating and answering stations are being authenticated. Further, system passwords and the secret session encryption key are stored in RAM 13c upon being generated during an authentication process. After each authentication and encryption exchange, the RAM 13c is either overwritten by data generated during a next occurring session, or erased and a new dynamic secret is written into the hard disk drive 17b.

The secure hash algorithm and bit-shuffling algorithms used in the generation of a message digest, as explained in more detail below, are stored on hard disk drive 5b and hard disk drive 17b.

Information to be exchanged between computer system 10 and computer system 11 is transferred over communication link 12 between communication adapters 6 and 18 under the control of processors 1a and 13a, respectively.

In order to ensure that an exchange of information between computer system 10 and computer system 11 will remain confidential, a bilateral authentication of the computer systems and an encryption of the information exchange must occur.

In accordance with the invention, both computer system 10 and computer system 11 have a unique plural bit identifier which is stored on their respective hard disk drives, and which may be exchanged by the computer systems in cleartext. The identifiers may be comprised of numerics and/or text. The static secret is known by each system, but is not exchanged over the communication link. The static secret never changes unless the current value is purposely overwritten with a new value.

A dynamic secret also is shared by the two computer systems, and held in confidence, and never transmitted over the communication link 12. The secret is dynamic in the sense that each time a bilateral authentication of the computer systems occurs, the dynamic secret is altered. The change value that is used is a pseudo-random number. As will be explained in more detail below, the dynamic secret makes the cryptographic result of the encryption key generator unpredictable without knowledge of both the static secret and the dynamic secret. As one aspect of the invention, the change value is not made part of any access request or information that is exchanged between the computer systems. Thus, the change value is not subject to discovery as a result of information communicated over the communication link 12.

It is to be understood that the static secret, the dynamic secret, the change value, and the session encryption key are never communicated out from the computer system in which they are generated and stored.

Figure 2:
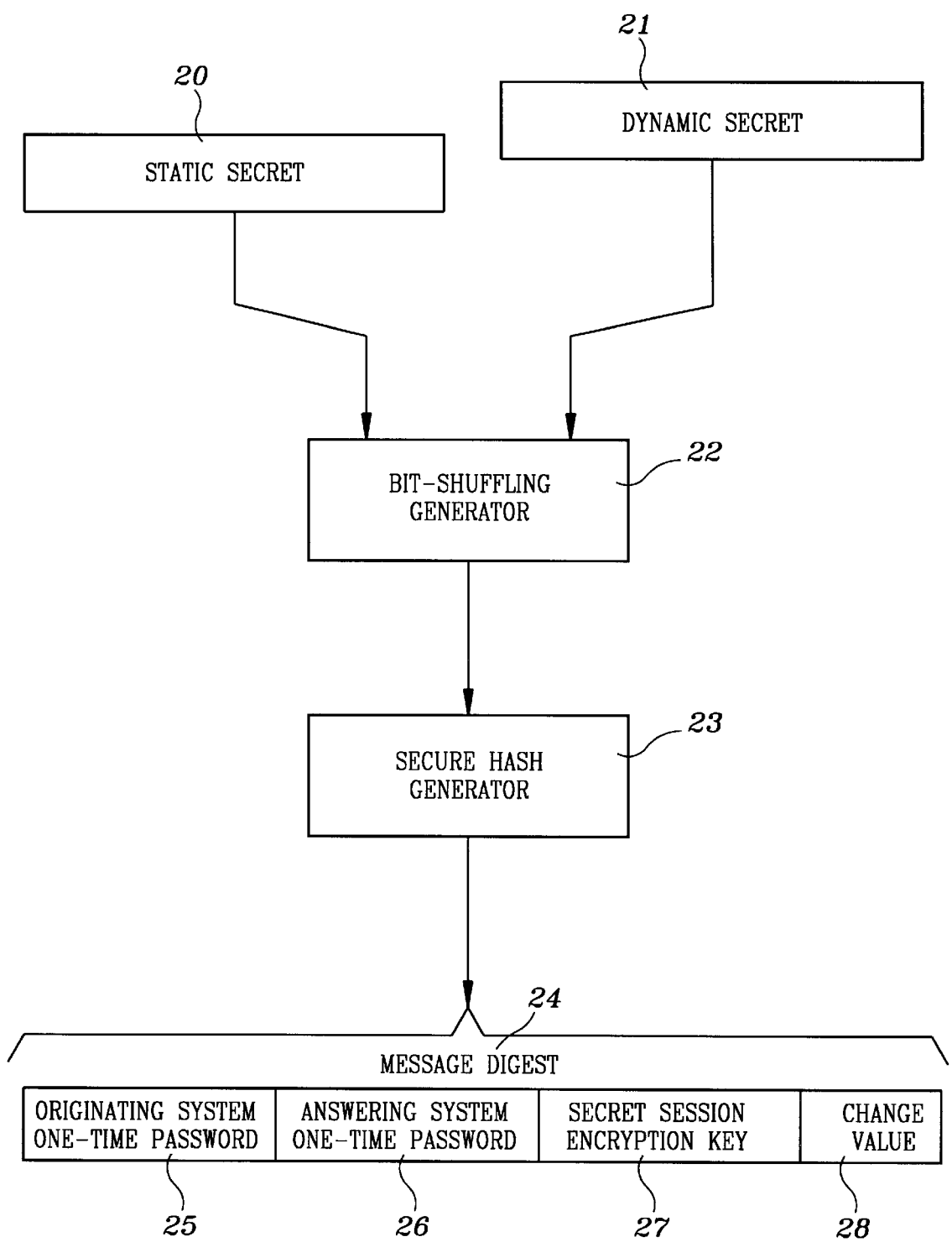
FIG. 2 is a graphic illustration of a logic process for generating message digests.

Once in possession of the identifiers, the static secret and the dynamic secret, both of the computer systems independently commence to combine the secrets as illustrated in FIG. 2. Referring to FIG. 2, a graphic illustration of the ensuing computer process is presented with a plural bit static secret 20, and a plural bit dynamic secret 21, which are applied as inputs to a bit-shuffling generator 22. The bit-shuffling generator employs a many-to-few bit mapping to shuffle the bits of the static and dynamic secrets. That is, the bits of the static secret and the dynamic secret are mixed to form a first pseudo-random result. The bit-shuffling algorithm continues to shuffle bits by wrapping the smaller of the inputs with the larger of the inputs until all bits of the larger input have been processed.

The process performed by the generator 22 may be comprised of any mathematical and/or logic function including, by way of example and not limitation, A⊕B=C, where A is the static secret, B is the dynamic secret, and the symbol ⊕ refers to an exclusive OR logic function. The output of the generator 22 is a pseudo-random result which is applied as an input to a secure one-way hash generator 23 to produce a message digest 24. In the preferred embodiment of the invention, the hash function which is used by the generator 23 is the Secure Hash Algorithm (SHA) as defined in FIPS PUB 180-1 (Apr. 17, 1995).

For purposes of the invention, the message digest 24 is divided into four sectors. The first sector is an originating system password 25 which is used one time, the second sector is an answering system password 26 which also is used one time, the third sector is a secret session encryption key 27, and the fourth sector is a change value 28. The contents of each of the sectors comprising the message digest are pseudo-random numbers, which each of the computer systems 10 and 11 have produced independently without need for synchronization. Thus, computer system 10 has its own one-time password and knows the one-time password for the computer system 11. Further, each has the secret session encryption key 27 without any exchanges other than system IDs over a communication media.

Figure 3A:
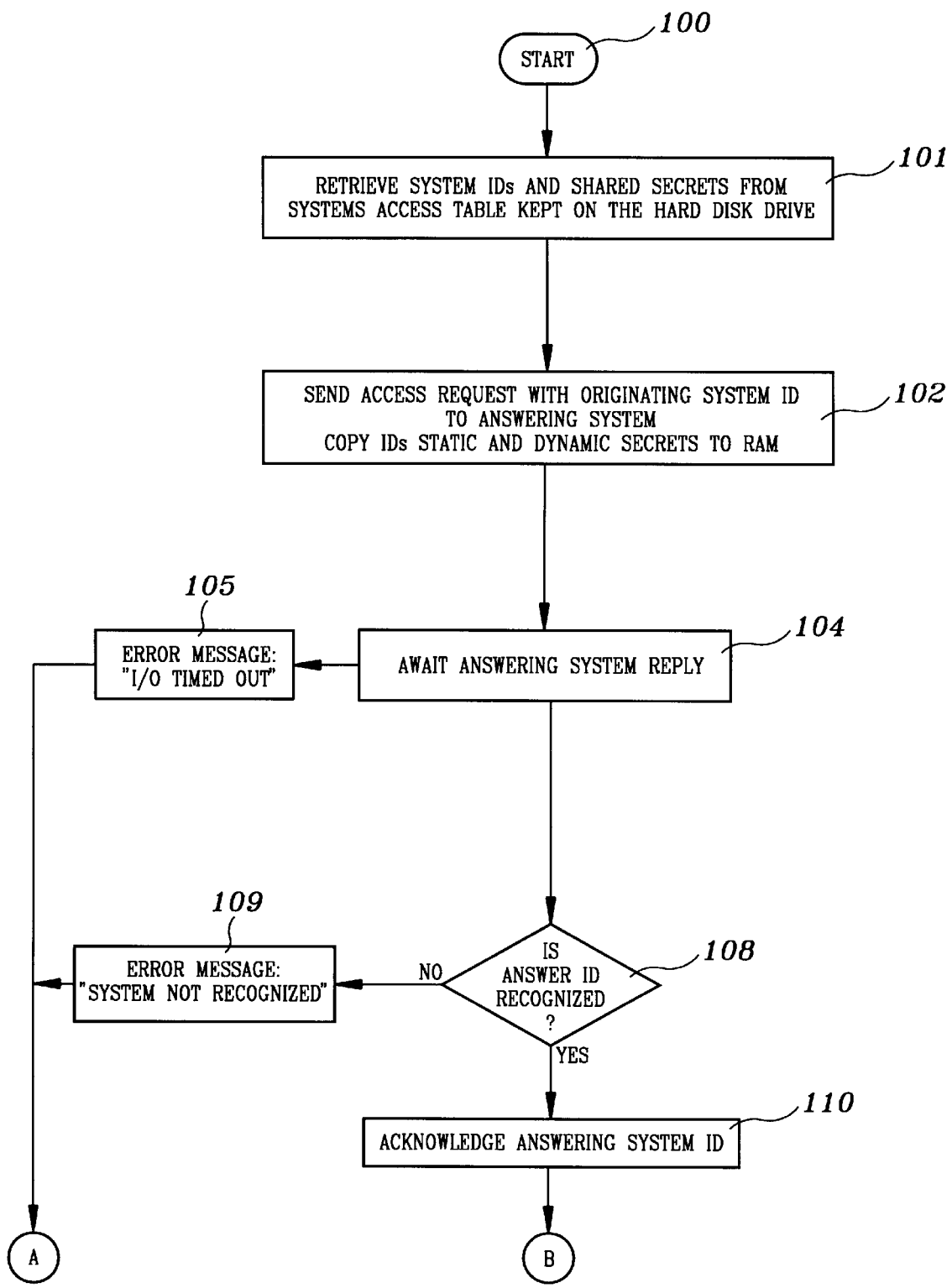
FIGS. 3a and 3b are logic flow diagrams of the application software used by an originating computer system in accordance with the invention.
Figure 3B:
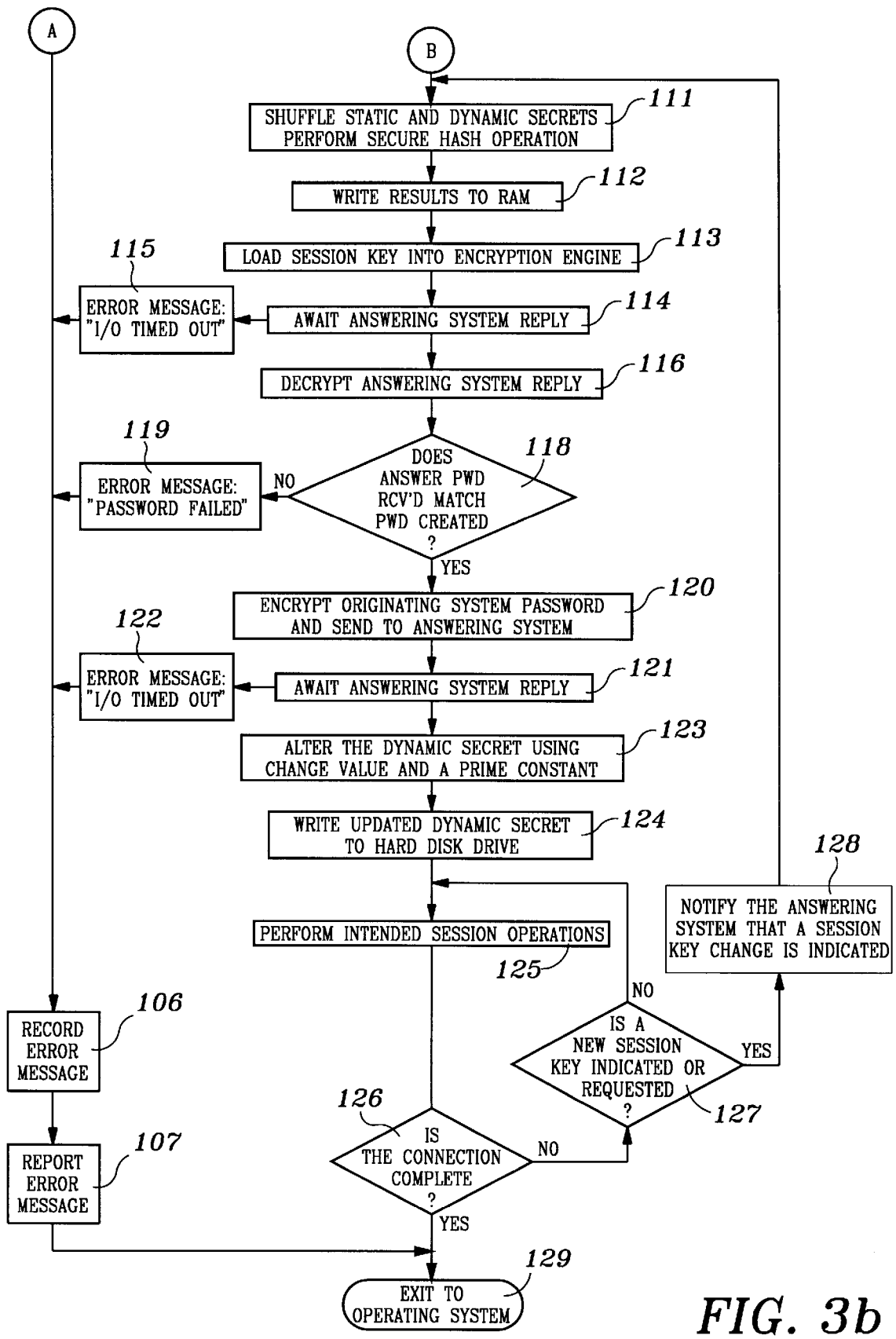

Referring to FIGS. 3a and 3b, the communication handshake protocol which is exercised by computer system 10 (originating system) is illustrated in the form of a logic flow diagram. The computer system 10 cycles through the logic flow diagram beginning with logic step 100. At logic step 101, the originating system retrieves the system IDs and secrets from a secrets table kept on the hard disk drive 5b. From logic step 101, the logic flow continues to logic step 102 and an access request is sent with the originating system ID, and the IDs and shared secrets are written to RAM 1d. The static secret and dynamic secrets are retrieved from hard disk drive 5b by using the targeted answering computer system ID as a tag.

Thereafter, the logic flow process proceeds to logic step 104 to await receipt of the computer system 11 ID. If the computer system 11 ID is not received within a predetermined time period, the logic flow process branches to logic step 105 where an "I/O Time Out" error message is reported.

From logic step 105 the logic flow process continues by way of node A to logic step 106 where a failed attempt record, maintained on hard disk drive 5b, is updated, and then proceeds to logic step 107 where the error message is reported to the application program and then to the user via display device 4.

If the computer system 11 ID is received before a time-out occurs at logic step 104, the expected ED for computer system 11 is compared at logic step 108 with the ID which has been received from the computer system 11. If a match does not occur, the logic flow process branches to logic step 109 where the error message "System Not Recognized" is reported. Thereafter, the logic flow process continues by way of node A to logic step 106 as before described.

If a match occurs at logic step 108, however, the logic flow process proceeds to logic step 110 where the computer system 10 issues an acknowledgment of the answering system ID to the computer system 11. The logic flow process thereafter proceeds by way of node B to logic step 111, where the static secret and dynamic secret are combined at logic step 111 by using a mathematical and/or logic function employing a many-to-few bit mapping. The bit shuffling algorithm continues to shuffle bits by wrapping the smaller of the inputs with the larger of the inputs until all bits of the larger input have been processed. The bit shuffling algorithm may be any mathematical or logic function which will perform a bit shuffle and/or a many-to-few bit mapping on the two inputs. The pseudo-random result then is subjected to a secure one-way hash operation. The secure hash operation also employs a many-to-few bit mapping to provide message digest 24, from which an originating system password 25, an answering system password 26, a secret session encryption key 27, and a change value 28 are extracted.

From logic step 111, the logic flow process continues to logic step 112, where the answering system ID, the originating system password 25, the answering system password 26, the secret session encryption key 27, and the change value 28 are written to RAM 1d of the computer system 10. The logic flow process then proceeds to logic step 113 where the secret session encryption key 27 is loaded into a user supplied encryption engine such as DES for encrypting all exchanges that occur thereafter between the computer system 10 and the computer system 11.

From logic step 113, the logic flow process continues to logic step 114 where the encrypted answering system password from computer system 11 is awaited. If the encrypted password is not received within a predetermined time period, an "I/O Timed Out" error message is reported at logic step 115 and the logic flow process then proceeds as before described. If the encrypted password is received before a time-out occurs, however, the logic flow process continues from logic step 114 to logic step 116 where computer system 11's encrypted password is decrypted through use of the secret session encryption key 27 and continues to logic step 118. If the computer system 11 password as decrypted does not match the answering system password 26 which was generated at logic step 111, the logic flow process reports a "Password Failed" error message at logic step 119, and then continues as before described. If a match occurs at logic step 118, however, the logic flow process continues from logic step 118 to logic step 120, where the originating system password 25 is encrypted by using the secret session encryption key 27 and transmitted over the communication link 12 to computer system 11. The logic flow process then proceeds to logic step 121 to await an answer from computer system 11 which indicates that the computer system access request has been either granted or denied.

If an access granted response is not received from the computer system 11 before a predetermined time period has expired, the logic flow process branches from logic step 121 to logic step 122 to generate an "I/O Timed Out" error message and then continues as before described. If an access granted response is received from computer system 11 before an I/O Time Out, however, the logic flow process continues from logic step 121 to logic step 123 where the dynamic secret 21 is altered by the change value 28 and a prime constant. The logic flow process thereafter writes the updated dynamic secret into the non-volatile memory of hard disk drive 5b at logic step 124.

From logic step 124, the logic flow process continues to logic step 125 to use the current secret session encryption key to perform encrypted information exchanges with computer system 11 during the current session. Thereafter, a determination is made at logic step 126 whether the current system connection has been completed. If not, the logic flow process determines at logic step 127 whether a new secret session encryption key should be generated. If so, the logic flow process proceeds from logic step 127 to logic step 128, where the computer system 11 is notified that a secret session encryption key change is indicated. The logic flow process thereafter returns to the input of logic step 111 to continue as before described. If a determination is made at logic step 127 to not change the secret session encryption key, then the logic process proceeds to the input of logic step 125 to continue as before described.

It is to be understood that a secret session encryption key may be generated upon request, as well as automatically after a bilateral authentication occurs.

From either logic step 107 or logic step 126 when a connection has been completed, the logic flow process proceeds to logic step 129 to exit the program and return to the operating system.

Figure 4A:
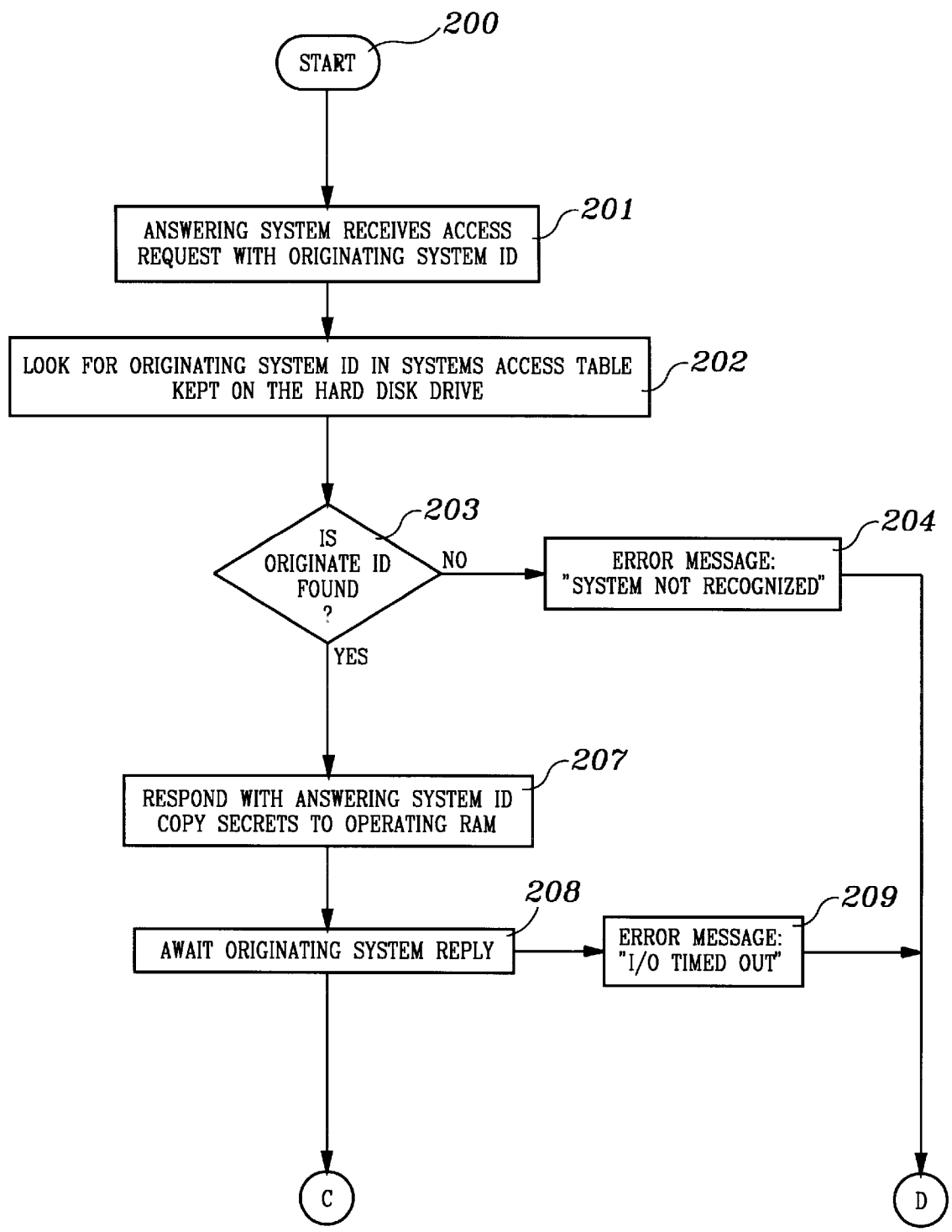
FIGS. 4a and 4b are logic flow diagrams of the application software used by an answering computer system in accordance with the invention.
Figure 4B:
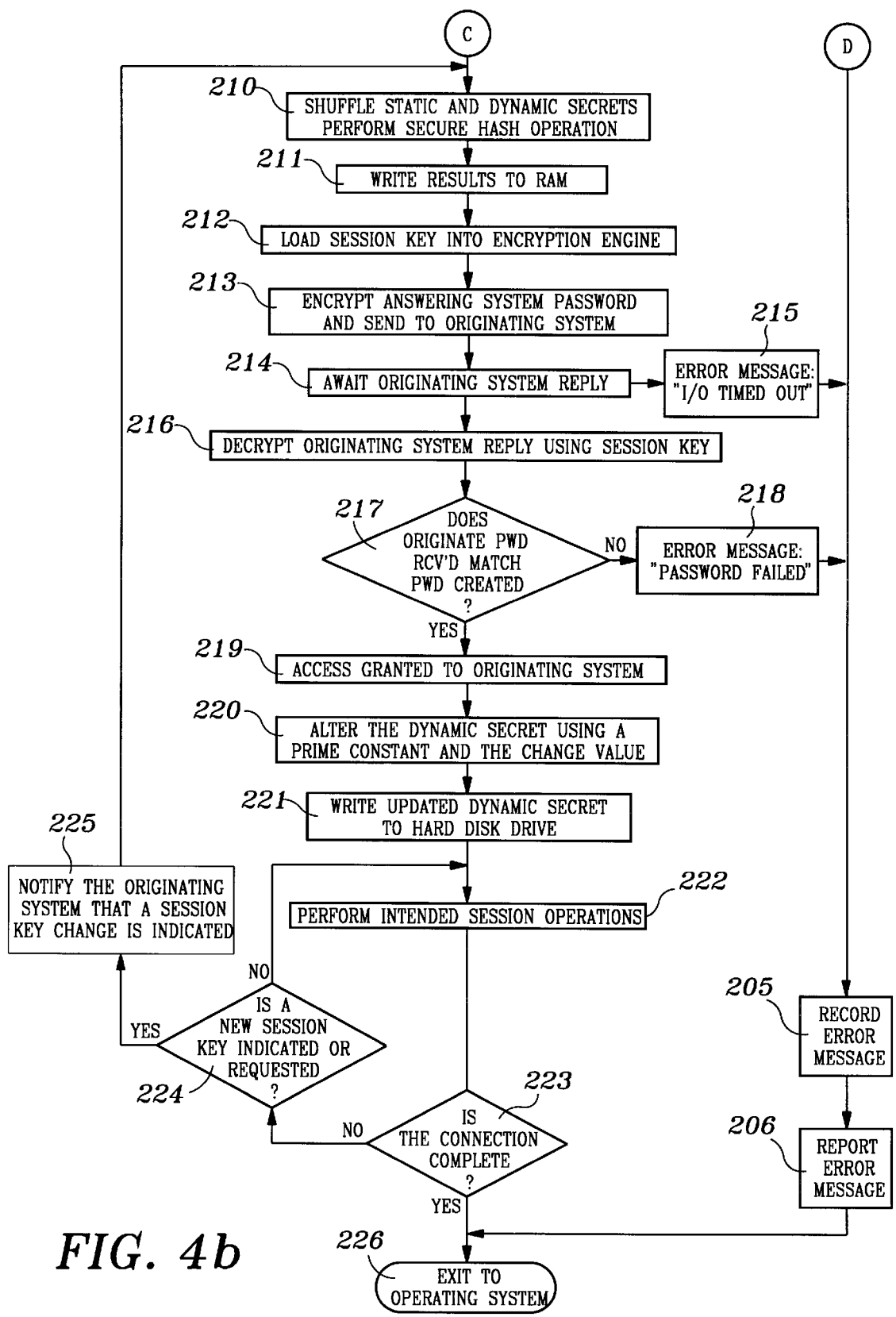

Concurrently with the above process, the answering system (computer system 11) independently executes the logic flow process illustrated in FIGS. 4a and 4b. More particularly, the logic flow process begins at logic step 200. Upon receipt of an access request and system identifier from computer system 10 at logic step 201, the logic flow process continues to logic step 202 to execute a search of an access table stored on the hard disk drive 17b to find the originating system ID and access the corresponding static and dynamic secrets. The originating system identifier supplied by the computer system 10 then is compared to the table look-up system identifier at logic step 203. If no match occurs, the logic flow process branches to logic step 204 to report a "System Not Recognized" error message. The logic flow process thereafter proceeds by way of node D to logic step 205 of FIG. 4b to record the error message on the hard disk drive 17b, and thereafter report the error message to the application program and the user at logic step 206.

If the ID is found at logic step 203, however, the logic flow process continues to logic step 207 where the system identifier of the answering system is transmitted to the originating system, and the IDs, the static secret and the dynamic secret are copied to RAM 13c. The logic flow process then proceeds to logic step 208 to await a response from the originating system indicating that the answering system identifier is acknowledged. If a response is not received from the originating system within a predetermined time period, a time-out occurs and the logic flow process branches to logic step 209 to report the error message "I/O Timed Out". From logic step 209, the logic flow proceeds by way of node D to logic step 205 of FIG. 4b where the process continues as before described.

If a response acknowledging the answering system's ID is received at logic step 208 before a time-out occurs, the logic flow process continues from logic step 208 by way of node C to logic step 210 of FIG. 4b, where the processor 13a uses the system identifier of the originating system 10 as a tag to perform a table look-up in RAM 13c to acquire static and dynamic secrets corresponding to the originating system 10. The static and dynamic secrets thereafter are applied as inputs to a bit-shuffling algorithm which is a software program stored on hard disk drive 17b. The bit-shuffling algorithm continues to shuffle bits by wrapping the smaller of the inputs with the larger of the inputs until all bits of the larger input have been processed. The bit-shuffling algorithm may be any mathematical and/or logic function which will perform a bit-shuffle operation and/or many-to-few bit mapping on the two inputs. The result of the bit shuffling operation then is subjected to a secure one-way hash operation, which performs a second many-to-few bit mapping to produce a message digest. The originating system password 25, the answering system password 26, the secret session encryption key 27 and the change value 28 then are extracted from the message digest at logic step 211 and written to an area of RAM 13c.

The originating and answering systems have thus generated the same passwords, secret session encryption key, and change value without exchanging more than an access request and their respective system identifiers in cleartext.

From logic step 211 of FIG. 4b, the logic flow process continues to logic step 212, where the secret session encryption key 27 is loaded into an encryption engine supplied by the user. All exchanges between the computer system 10 and the computer system 11 which occur hereafter during this communication connection are encrypted.

The logic flow process proceeds from logic step 212 to logic step 213, where the answering system password 26 is encrypted by using the encryption key 27 and transmitted to the originating system 10. Thereafter, the logic flow process at logic step 214 awaits the receipt of the encrypted originating system password 25 from computer system 10. If the encrypted password is not received before the expiration of a predetermined time period, the logic flow process branches from logic step 214 to logic step 215 to report the error message "I/O Timed Out". Thereafter, the logic flow process proceeds to logic step 205, where the logic process continues as before described.

If an encrypted password is received from computer system 10 at logic step 214 before a time-out occurs, the logic flow process continues to logic step 216 where the secret session encryption key 27 is used to decrypt the password received from the originating system 10. Thereafter, the password received from the originating system is compared at logic step 217 with the originating system password 25 generated at logic step 210. If no match occurs at logic step 217, the logic flow process branches from logic step 217 to logic step 218 where the error message "Password Failed" is reported. The logic flow process then proceeds to logic step 205 where the logic process continues as before described.

If a match occurs at logic step 217, however, the logic flow process proceeds to logic step 219 to transmit an access granted signal to the originating system. Thereafter, the dynamic secret stored in RAM 13c is altered by the change value 28 and a prime constant at logic step 220. From logic step 220 the logic process continues to logic step 221, where the updated dynamic secret is written into the non-volatile memory of hard disk drive 17b. From logic step 221 the logic flow process continues to logic step 222, where the secret session encryption key is used to encrypt information exchanged with the computer system 10 during the current session. Thereafter, a determination is made at logic step 223 whether the current system connection is complete. If not, the logic flow process determines at logic step 224 whether a new secret session encryption key should be generated. If not, the logic flow process returns to the input of logic step 222 to continue as before described. If the secret session encryption key is to be changed, however, the logic flow process proceeds from logic step 224 to logic step 225 to notify the originating system, computer system 10, that a new secret session encryption key is indicated. Thereafter, the logic flow process returns to logic step 210 to continue as before described.

From logic step 206, or from logic step 223 after a system connection has been completed, the logic flow process exits the program at logic step 226.

From the above descriptions, it now should be evident that after a cleartext access request and exchange of system identifiers to perform a first bilateral authentication, all exchanges between the two computer systems are thereafter in ciphertext. That is, the exchange occurs only in an encrypted form. Further, while the static secret and the initial dynamic secret are shared by each system, they are not exposed outside of the originating and answering systems. In addition, the passwords, change value, and secret session encryption key are used only during a current system connection. The dynamic secret is altered by a pseudo-random change value and prime number after each system connection, thus causing the message digest output of the secure hash algorithm to completely change from one pseudo-random number to another pseudo-random number. Further, the inputs to the secure hash algorithm are bit-shuffled and subjected to a first many-to-few bit mapping prior to the secure hash generation, and subjected to a second many-to-few bit mapping during the secret hash operation. Thus, any likelihood of the static secret or the current dynamic secret being discovered through either cryptographic analysis or brute force attack is made substantially remote to impossible. Further security enhancements by way of a second bilateral authentication occur in the exchange of encrypted passwords before encrypted information is exchanged.

Figure 5:
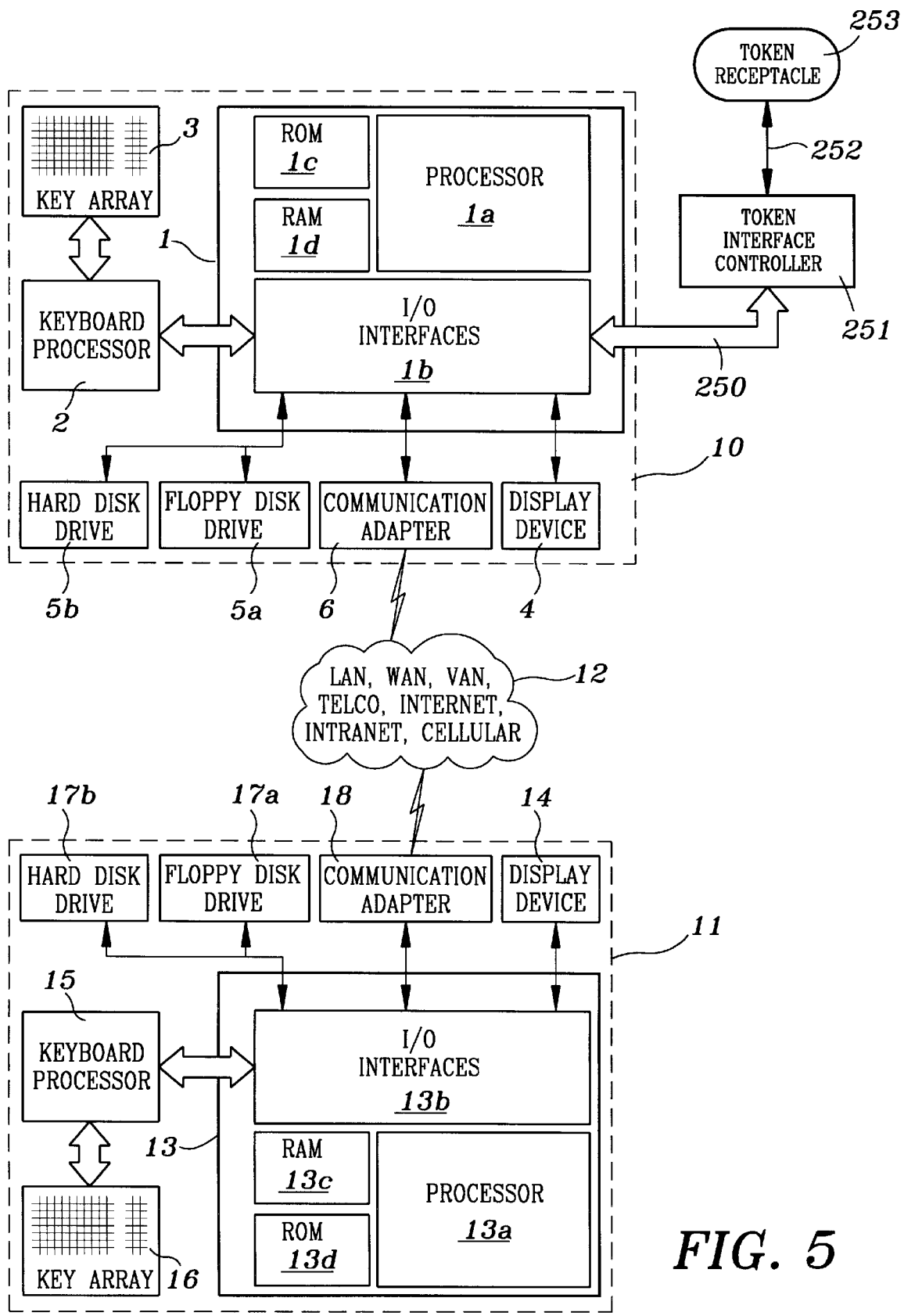
FIG. 5 is a functional block diagram of two computer systems communicating by way of a communications medium, with the originating system 10 having a token receptacle with a token interface controller in accordance with the invention.

FIG. 5 illustrates the computer systems of FIG. 1 with the addition of a serial bit stream, bi-directional bus 250 in compliance with ISO standard 7816-3, and electrically connected to the I/O Interfaces 1b at one end. The bus 250 is also electrically connected to a token interface controller 251 at the other end. An I/O node of the controller 251 in turn is electrically connected by way of a bus 252 to a token receptacle 253 for receiving a token system which may be a tamper resistant security module (TRSM). Instead of the bus 252, a wireless IR or RF system, an inductive or capacitive system, an optical system, an ultrasonic system, or a electromagnetic system may be used to communicate with the token receptacle 253.

The system of FIG. 5 differs from that of FIG. 1 in that the token system, rather than computer system 10, contains the static and dynamic secrets and encryption key generator necessary for generating the originating system password 25, answering system password 26, secret session encryption key 27, and change value 28.

Figure 6:
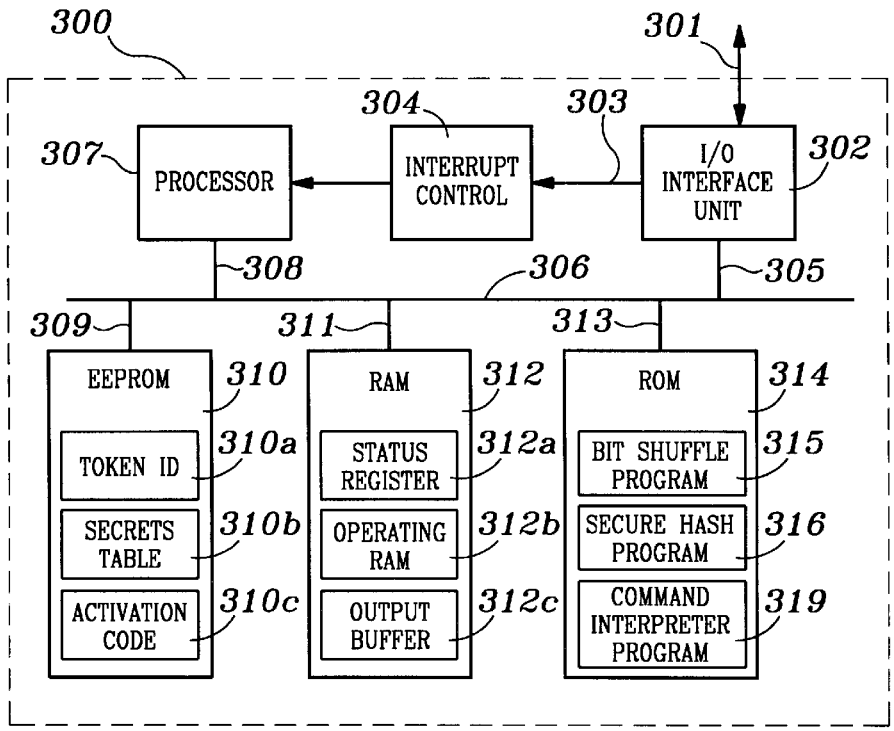
FIG. 6 is a functional block diagram of a token system 300 for use with the originating system of FIG. 5.

Referring to the functional block diagram of FIG. 6, a token system 300 is illustrated with a communication bus 301 which is electrically connected to an I/O interface unit 302. Unit 302 in turn is electrically connected by way of a conducting line 303 to an interrupt control unit 304, and by way of a multi-bit address bus 305 to a bus 306 comprised of a 15-bit address bus, an 8-bit data bus, and a 4-bit control bus.

The interrupt control unit 304 is electrically connected to an 8-bit, 4.0 MHz processor 307, which in turn is electrically connected by way of a conducting line 308 to the bus 306. The bus 306 further is electrically connected by way of a conducting line 309 to a non-volatile, 8160 byte, Electrically Erasable Programmable Read Only Memory (EEPROM) 310 in which is stored a token ID 310a, a static and dynamic secrets table 310b, and an activation code 310c. The bus 306 still further is electrically connected by way of a conducting line 311 to a 246 byte volatile RAM 312 which is partitioned into status register 312a, an operating RAM area 312b, and an output buffer 312c. Status register 312a contains an activation bit to indicate the status of the token activation, and a mode bit to indicate whether the token is attached to an originating or answering system. Operating RAM 312b is used as the scratch pad and RAM memory for processor 307. Output buffer 312c is used as an output register to facilitate outputting information back to the host computer. The bus 306 still further is electrically connected by way of a conducting line 313 to a 12800 byte ROM 314. Firmware defining the operation of the processor 307, and including a bit-shuffle program 315, a secure hash program 316, and a command interpreter program 319 is stored in the ROM 314.

The secrets table 310b may include information related to multiple systems, where plural systems serve as communication relays between the originating system and the final destination answering system. Since the session encryption key changes with each new system connection, each communication relay is separately secured. Hence, once the token system and first answering system relay have completed their authentication cycles, the token system may thereafter complete authentication rounds with successive answering system relays without user intervention. This is known as "single sign-on".

In operation, a host system (not shown) inputs commands and data to the token system 300, and receives status information and processing results from processor 307 by way of communication bus 301. When information from the host system is written into the I/O interface unit 302, an interrupt is generated by the interrupt control unit 304. In response to the interrupt, the processor 307 exits from a wait-state and executes a command interpreter program 319 stored in the ROM 314. As a result, the information which has been written into the I/O interface unit 302 is copied to operating RAM 312b.

In response to a system ID and a command sent by a host processor (not shown) to direct the generation of an encryption key, the processor 307 accesses the static secret and dynamic secret table 310b stored in EEPROM 310. Secrets corresponding to a system ID thereby are retrieved, and the bit-shuffle program 315 stored in the ROM 314 is executed. Thereafter, the output of the bit-shuffle program is stored in operating RAM 312b. The processor 307 next acquires the secure hash program 316 stored in ROM 314 and the bit-shuffle output stored in operating RAM 312b, and executes the secure hash program 316 on the bit-shuffle result to produce a message digest.

In the preferred embodiment described herein, the system of FIG. 6 may be purchased as part number MC68HC05SC28 from Motorola Semiconductor Product Sector Headquarters located at 3102 North 56th Street, Phoenix, Ariz. 85018. The timing parameters and transmission protocols for the system are in accordance with ISO/IEC 7816-3.

Figure 7:
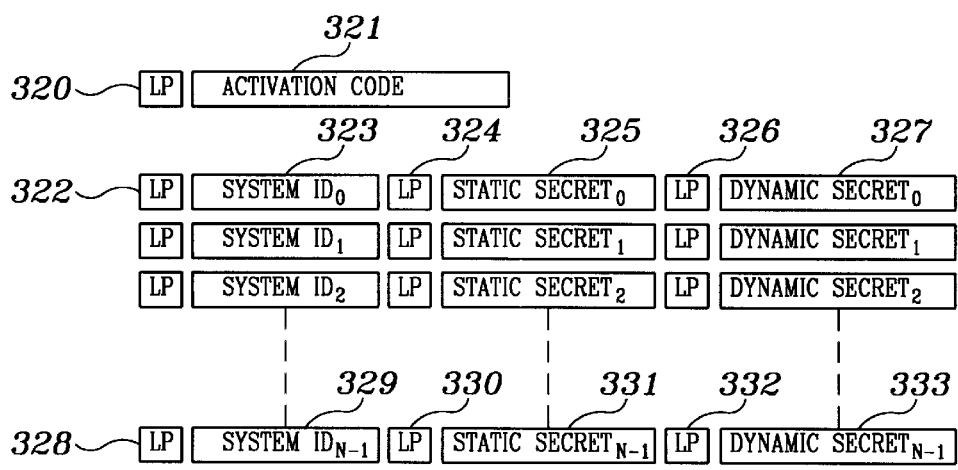
FIG. 7 is a diagram of a static secret and dynamic secret table as stored in EEPROM 310 of the token system 300 of FIG. 6.

The secrets table 310b stored in the EEPROM 310 of FIG. 6 is shown in detail in FIG. 7, where the first information sector of the first line of information is a length parameter LP 320 which specifies the size of the data field that follows. The LP 320 is necessary because the data fields of each table entry are variable in length. The length may be changed as the need for greater security arises. The data field of the first line of table information consists of an activation code 321. The activation code 321 must be entered into the token system 300 before a message digest can be generated.

In the second line of table information, an LP 322 precedes a system $ID_0$ 323 which is used as a tag to find the associated LP 324, static secret$_0$ 325, LP 326, and associated dynamic secret$_0$ 327. As shown in FIG. 7, the table has entries for n stations, with the nth station having the line of table information including LP 328, system $ID_{n-1}$ 329, LP 330, static secret$_{n-1}$ 331, LP 332, and dynamic secret$_{n-1}$ 333.

Figure 8:
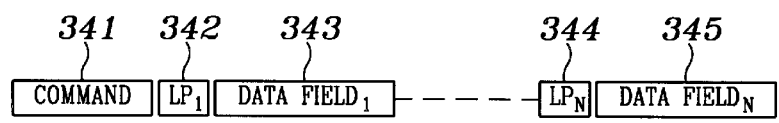
FIG. 8 is an illustration of a token command sequence issued by a host system to the token system 300 of FIG. 6.

FIG. 8 depicts a transmission sequence which is transmitted by the host system over communication link 301 to the I/O interface unit 302 to write a command to the token system 300. The command byte 341 specifies operations such as "Begin Authentication Operation" and "Verify Password", as will be described in detail below. A first length parameter 342 follows the byte 341, and precedes a first plural-byte data field 343. The length parameter indicates the byte length of data field 343, which may be followed by one or more pairs of length parameter(s) 344 and associated data field 345. The length parameter 344 in turn is followed by an associated multi-byte data field 345. As before, the length parameter 344 indicates the byte length of the data field 345.

When the transmission sequence of FIG. 8 is transmitted by the host system over communication link 301 to the I/O interface unit 302, the command 341 is recognized by the command interpreter program 319 stored in ROM 314, which is executed by the processor 307 to perform the command illustrated as byte 341. For example, when the command is to generate a message digest, the command will be followed by a length parameter 342 indicating the byte length of the system ID represented by data field 343. The processor 307 will store the command 341, length parameter 342, data field 343, and when applicable, the length parameter 344 and data field 345 defining the mode of operation, into the operating RAM 312b for further processing as before described.

Figure 9:
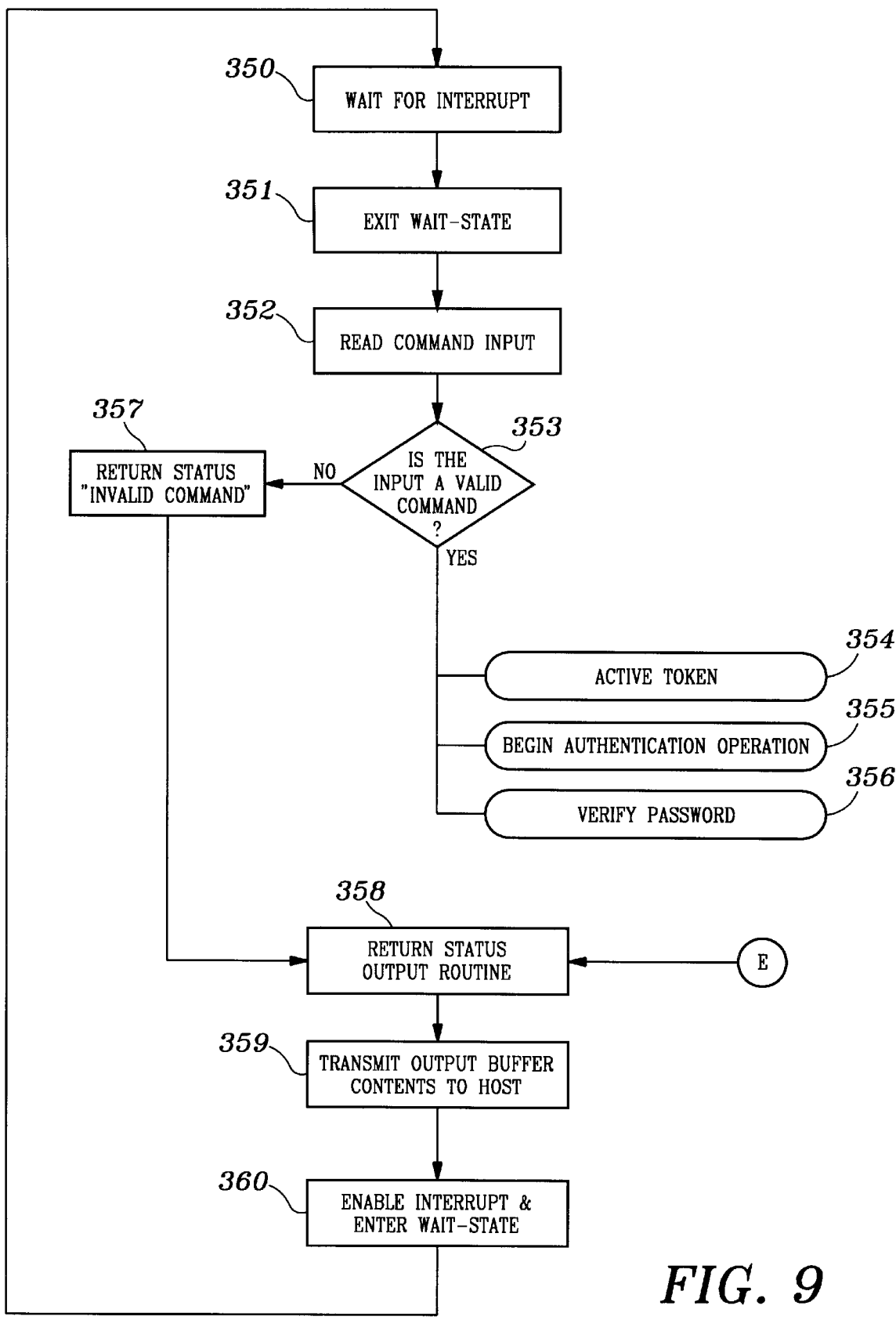
FIG. 9 is a logic flow diagram of a command interpreter system stored in the ROM 314 of the token system 300 of FIG. 6.

Referring to FIG. 9, all logic flow begins with logic step 350, where processor 307 is in a wait-state. When the host writes a command to the I/O interface unit 302, the interrupt control unit 304 generates an interrupt signal to the processor 307 to cause the logic flow to exit the wait-state at logic step 351. The logic flow process then proceeds to logic step 352, where the command input from the I/O interface unit 302 is read. From logic step 352, the logic flow process proceeds to logic step 353 where the command input is compared to "Activate Token", "Begin Authentication Operation", and "Verify Password" commands stored in a command interpreter table residing in the command interpreter program 319. If the command input is a valid command, the logic process jumps to the appropriate one of logic steps 354, 355 and 356 leading to logic flow sequences respectively illustrated in FIGS. 10, 11, and 12a and 12b.

After the appropriate one of the logic flow sequences of FIGS. 10, 11 and 12a and 12b is completed, the logic flow process returns by way of node E to logic step 358. Further, if no valid command input is found to exist at logic step 353, the error code message "Invalid Command" is written to the output buffer 312c at logic step 357 before the logic flow process enters logic step 358.

At logic step 358, the logic flow process checks the output buffer 312c in RAM 312 to determine whether there are any contents to be output. From logic step 358, the logic flow process moves to logic step 359 and the contents of the output buffer 312c are transmitted to the host by way of the I/O interface unit 302. Thereafter, at logic step 360, the command interpreter program 319 enables the interrupt control unit 304, and thereby causes the processor 307 to enter a wait-state. From logic step 360, the logic flow process continues as before described.

Figure 10:
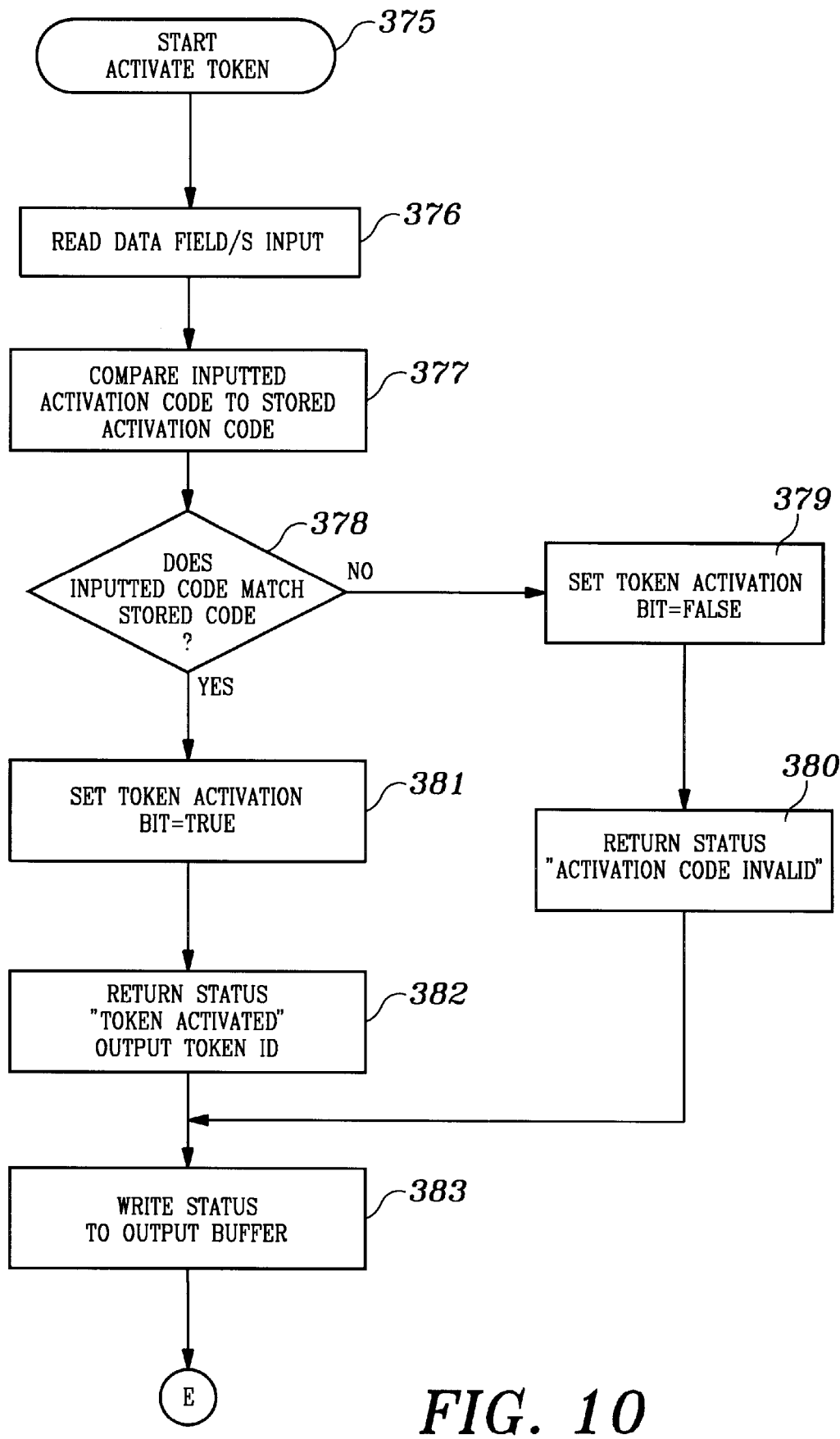
FIG. 10 is a logic flow diagram of the execution of an activate token command by the token system 300 of FIG. 6.

The execution of the host command "Activate Token" by the processor 307 is illustrated in FIG. 10, where the processor 307 jumps from logic step 354 of FIG. 9 to commence the logic flow process at logic step 375 of FIG. 10. At logic step 376, the activation code is copied from the I/O interface unit 302 into operating RAM 312b. The activation code input then is supplied to a comparator at logic step 377, and compared to the activation code 310c previously stored in EEPROM 310. If a code match is not detected at logic step 378, the logic flow process branches to logic step 379 where the token activation status bit in status register 312a is set to false, and then proceeds to logic step 380. At logic step 380 an invalid code event is reported, and a status message "Activation Code Invalid" is written to the output buffer 312c at logic step 383. The logic flow process then proceeds by way of node E to logic step 358 of FIG. 9.

Continuing with FIG. 10, if a code match occurs at logic step 378, the logic flow process continues to logic step 381 where the token activation status bit is set to true in status register 312a of RAM 312. From logic step 381, the logic flow process proceeds to logic step 382 to write the status message "Token Activated" and the token ID 310a to the output buffer 312c before jumping by way of node E to logic step 358 of FIG. 9.

Figure 11:
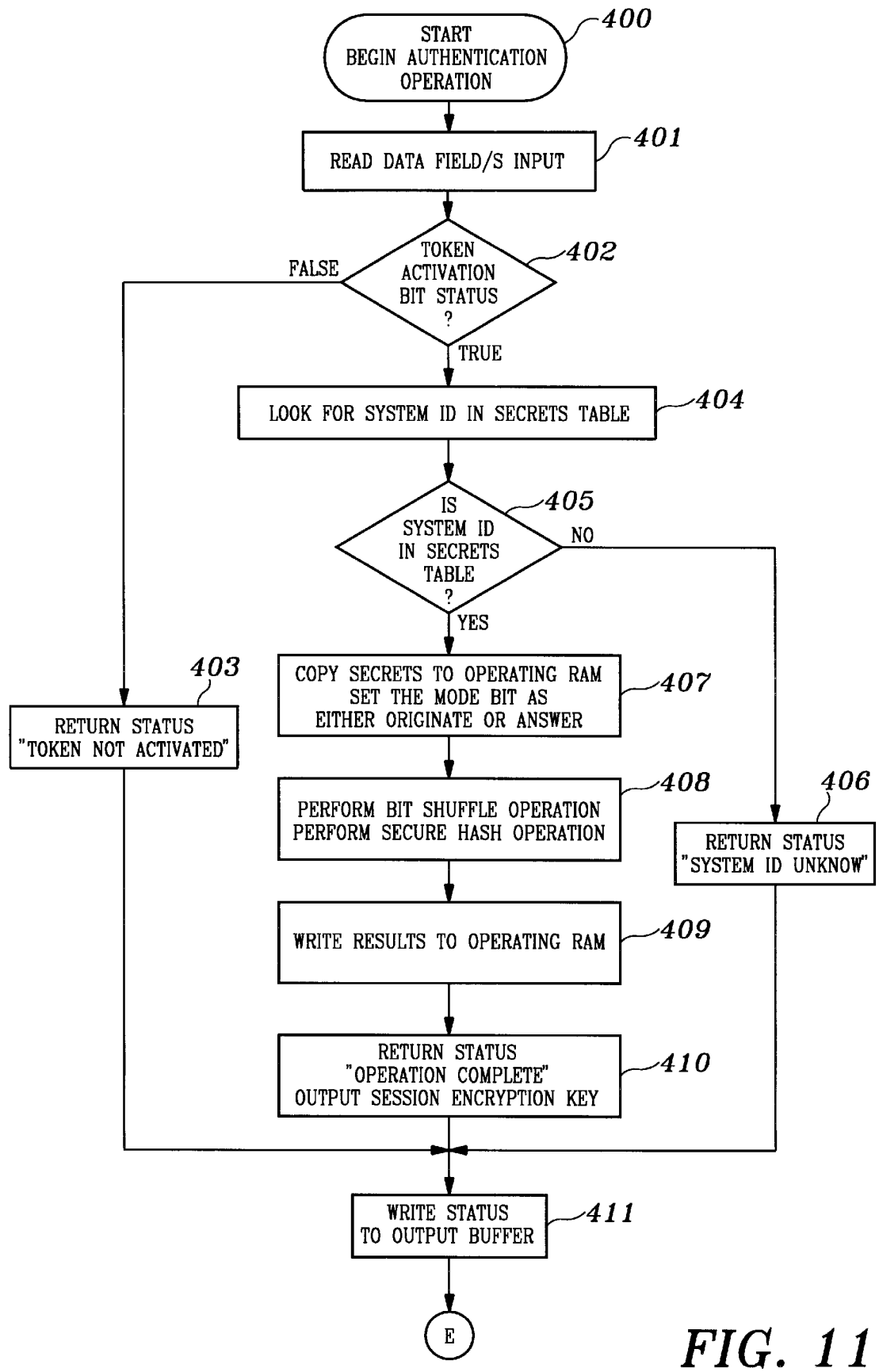
FIG. 11 is a logic flow diagram of a begin authentication operation command by the token system 300 of FIG. 6.

Referring to FIG. 11, a logic flow process for the execution of the host command "Begin Authentication Operation" by processor 307 of token system 300 is illustrated. The logic flow process begins at logic step 400. At logic step 401 the input is copied from the I/O interface unit 302 to operating RAM 312b. From logic step 401 the logic flow process proceeds to logic step 402 where the processor 307 checks the status of the token activation bit in status register 312a. If the token has not been activated, the logic flow process branches to logic step 403 to report the error message "Token Not Activated", and then proceeds to logic step 411 where the status is written to output buffer 312c. The logic flow process then jumps by way of node E to logic step 358 of FIG. 9.

If the token has been activated, however, the logic flow process continues from logic step 402 to logic step 404, where the secrets table 310b of EEPROM 310 is searched for the ID of the system to which the token is to be authenticated. If the system ID is not found, the logic flow process proceeds from logic step 405 to logic step 406, where an error code for a "System ID Unknown" status is reported. The logic flow process then proceeds to logic step 411 where the status is written to the output buffer 312c. Thereafter, the logic flow process jumps by way of node E to the logic step 358 of FIG. 9.

If the system ID is found at logic step 404, the logic flow process continues through logic step 405 to logic step 407. At logic step 407, static and dynamic secrets associated with the system ID are copied to operating RAM 312b, and a mode bit of status register 312a is set to identify the attached system as an originating or answering system. From logic step 407, the logic flow process continues to logic step 408 to combine the static and dynamic secrets read from operating RAM 312b by means of a bit shuffling operation, and thereafter apply a secure hash operation to the result to generate a message digest. At logic step 409, an originating system password 25, an answering system password 26, and a change value 28 are extracted from the message digest and written into operating RAM 312b. The step by step process performed at logic steps 408 and 409 are illustrated in FIG. 2.

At logic step 410 of FIG. 11, status is reported as "Operation Complete" and a deterministic, non-predictable, pseudo-random, and symmetric encryption key 27 is extracted from the message digest 24. The logic flow process then continues to logic step 411 where the status and encryption key are written to the output buffer 312c. Thereafter, the logic flow process jumps from logic step 411 to logic step 358 of FIG. 9 by way of node E.

Figure 12A:
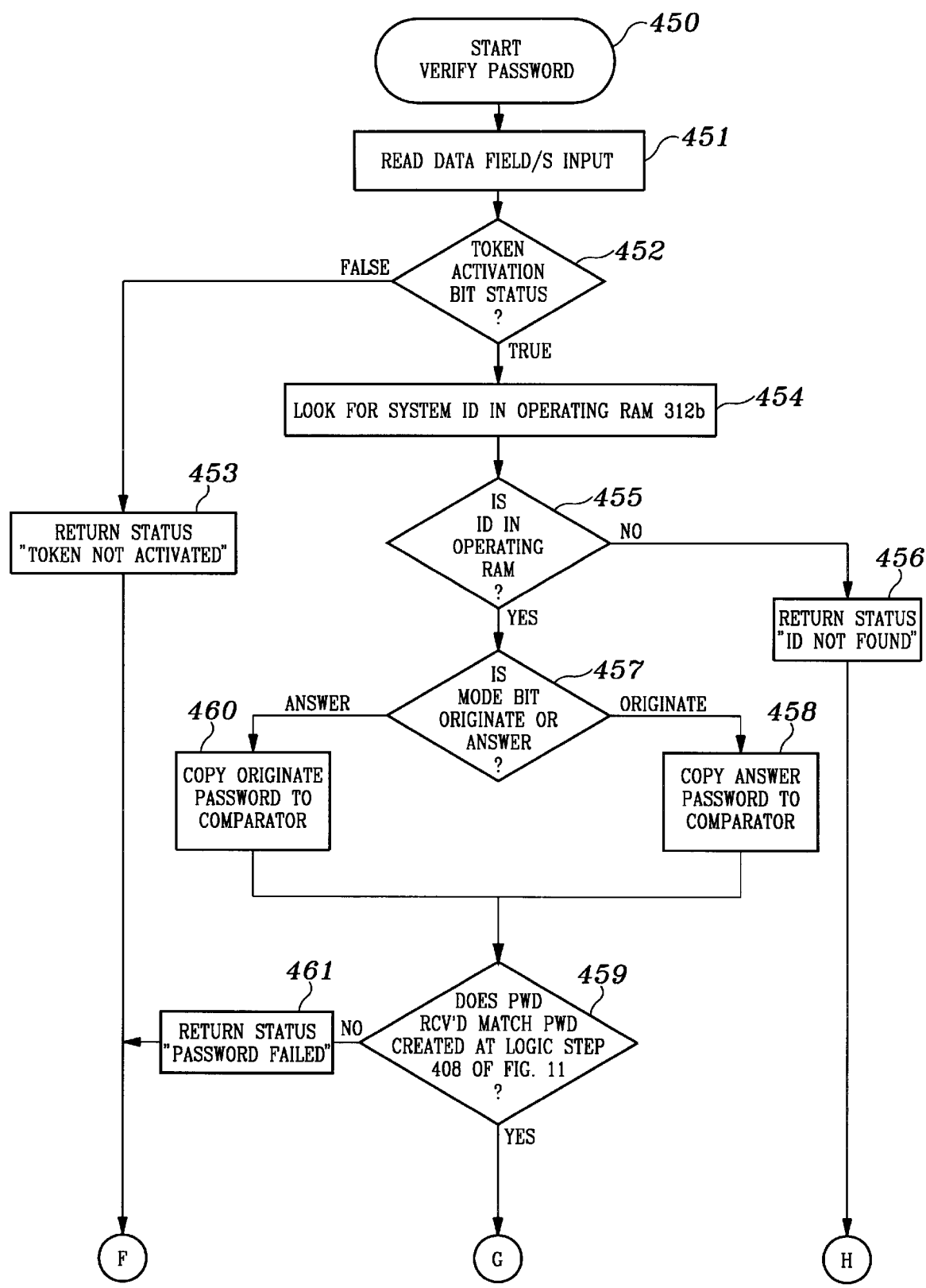
FIGS. 12a and 12b are logic flow diagrams of the execution of a verify password command by the token system 300 of FIG. 6.
Figure 12B:
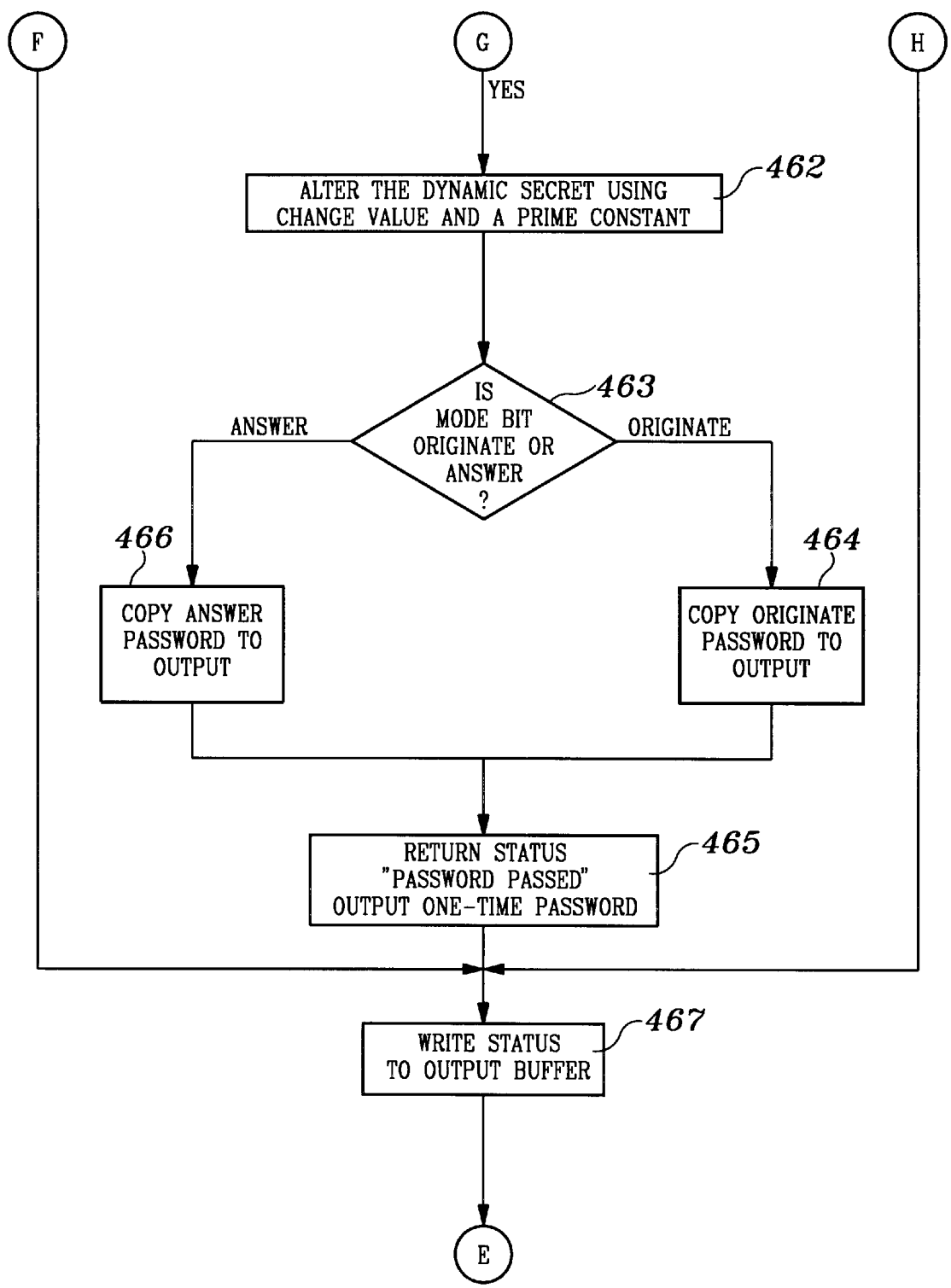

FIG. 12 illustrates the logic steps performed by the token system 300 in response to a "Verify Password" command from the host. Upon the token system 300 receiving the command, the logic flow process moves from logic step 450 to logic step 451, where the input command code and data fields are transferred from the I/O interface unit 302 to the operating RAM 312b. Thereafter, the token activation bit stored in status register 312a is checked at logic step 452 by the processor 307 to determine whether the token system 300 has been activated. If not, the logic flow process branches to logic step 453 to report the error message "Token Not Activated". Logic flow then proceeds by way of connecting node F to logic step 467 of FIG. 12b where the status is written to the output buffer 312c. The logic flow process then jumps to logic step 358 of FIG. 9 by way of node E.

If the token activation bit is found to be set true at logic step 452 of FIG. 12a, the logic flow process proceeds to logic step 454 where operating RAM 312b is searched for the ID of the system to which token system 300 is being authenticated. If the system ID is not found in operating RAM 312b, the logic flow process branches from logic step 455 to logic step 456 to report the error message "ID Not Found". Logic flow then proceeds by way of connecting node H to logic step 467 of FIG. 12b where the status is written into output buffer 312c. The logic flow process then jumps by way of node E from logic step 467 to logic step 358 of FIG. 9.

If the system ID is found in operating RAM 312b at logic step 455 of FIG. 12a, the logic flow process continues to logic step 457 to read the mode bit stored in status register 312a. If an answering system is indicated, the logic flow process branches to logic step 460 to copy the originating system password 25 stored in operating RAM 312b into a comparator. If an originating system is indicated by the mode bit at logic step 457, the logic flow process proceeds to logic step 458 to copy the answering system password 26 stored in operating RAM 312b into the comparator.

From either logic step 460 or logic step 458, the logic flow process continues to logic step 459 to determined whether the password created by the token system 300 matches the password received at logic step 451. If a match does not occur, the logic flow process branches from logic step 459 to logic step 461 to report the error message "Password Failed", and then proceeds by way of node F to logic step 467 of FIG. 12b to continue as previously described. If a match occurs at logic step 459, however, the logic flow process proceeds via node G to logic step 462 of FIG. 12b. At logic step 462, the dynamic secret is altered with a prime constant and the change value 28 created at logic step 408 of FIG. 11 is stored in operating RAM 312b. Further, the updated dynamic secret is written to the secrets table 310b. Thereafter, the logic flow process continues from logic step 462 to logic step 463 to read the mode bit stored in status register 312a. If an answering system is indicated, the logic flow process branches to logic step 466 to copy the answer system password 26 stored in operating RAM 312b to the output. If an originating system is indicated by the mode bit at logic step 463, the logic flow process proceeds to logic step 464 to copy the originate system password 25 to the output. Thereafter, the return status logic step 465 reports the message "Password Passed" and the appropriate system password. From logic step 465, logic flows to logic step 467 where the status and password are written to the output buffer 312c. The logic flow process then jumps by way of node E to logic step 358 of FIG. 9.

Figure 13A:
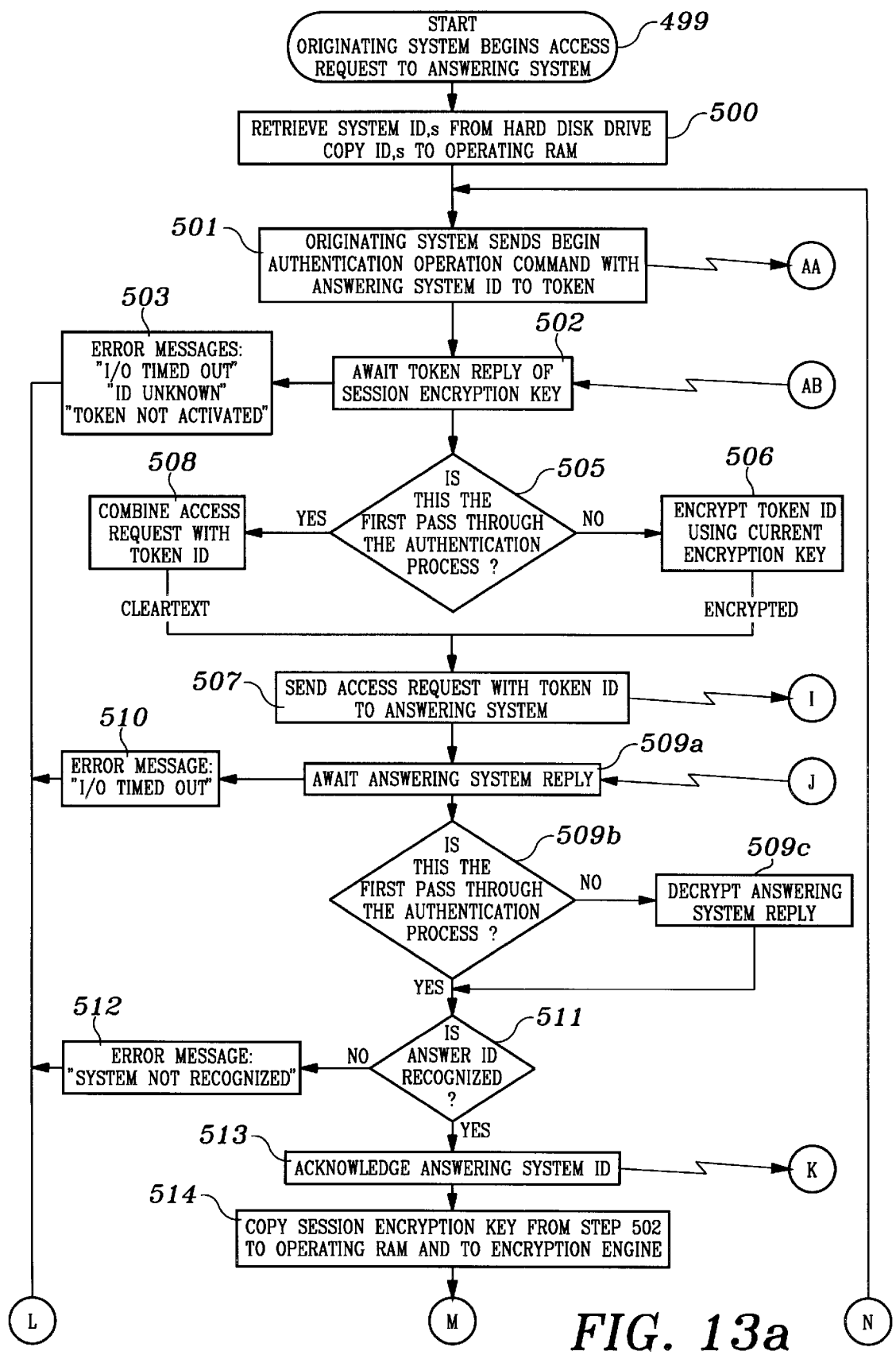
FIGS. 13a and 13b are logic flow diagrams of the application software executed by an originating system having a token system as illustrated in FIG. 5.
Figure 13B:
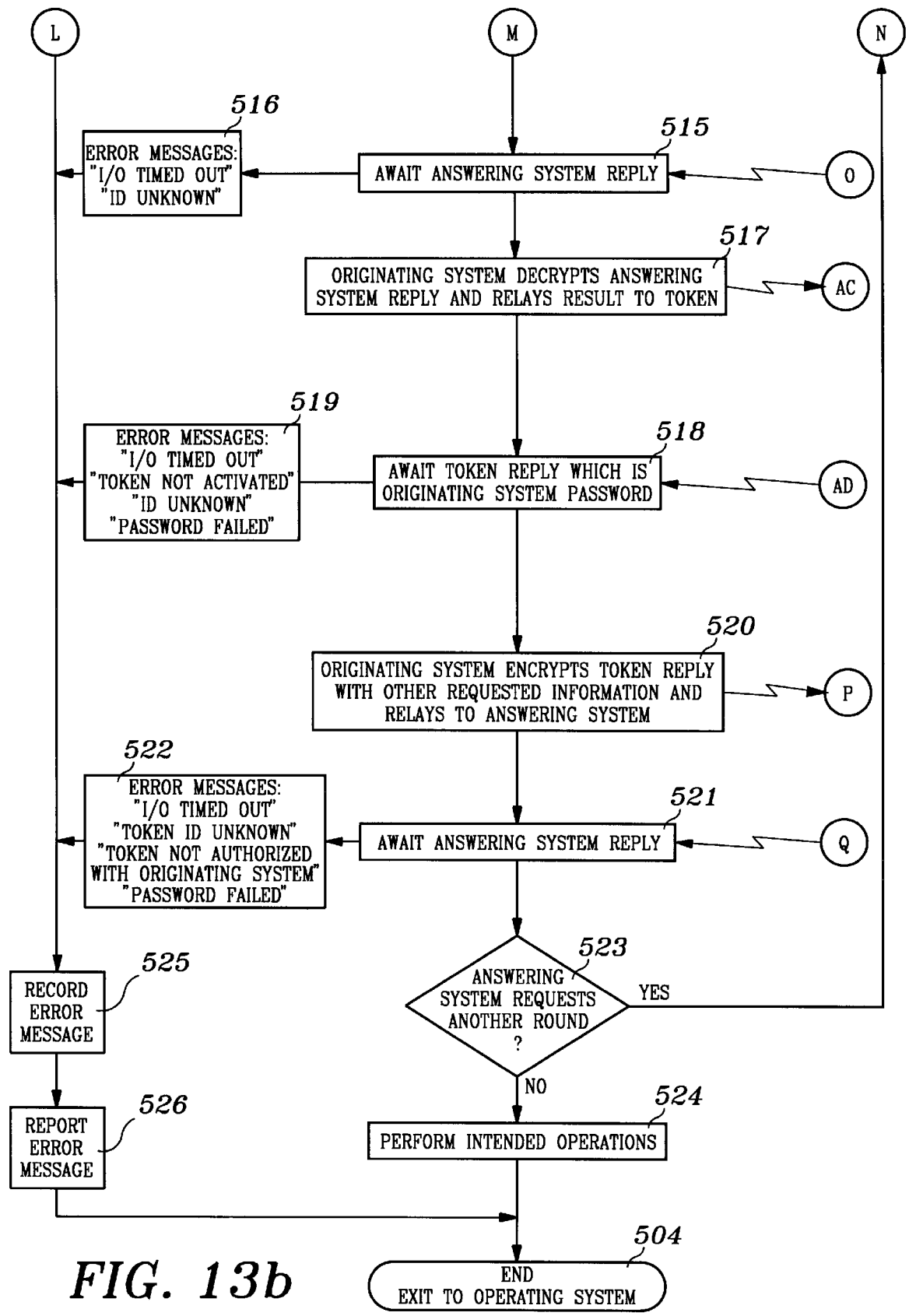

The operation of computer system 10 of FIG. 5 with the token system 300 is illustrated in FIGS. 13a and 13b, where computer system 10 begins an access request to the answering system 11 at logic step 499. At logic step 500, computing system 10 retrieves the system IDs from hard disk drive 5b and stores the IDs in RAM 1d. The first time the system IDs are written to RAM 1d, the computer system ensures that there is no current associated encryption key and there is sufficient space for future encryption keys. At logic step 501, computer system 10 sends a "Begin Authentication Operation" command and the answering system ID through node AA to the token system 300 by way of communication link 250 of FIG. 5. Thereafter, at logic step 502, computing system 10 awaits a reply from the token system 300 by way of communication link 250 and node AB. If the token is activated, the reply will include the encryption key generated at logic step 408 of FIG. 11. If the reply is not received at logic step 502 within a predetermined time period, the computer system 10 will report the error message "I/O Timed Out" at logic step 503. In addition, the token system 300 may reply with the error message "ID Unknown" or "Token Not Activated" at logic step 503. Thereafter, the logic flow process will proceed from logic step 503 by way of node L to logic step 525 of FIG. 13b. At logic step 525 the error condition is recorded in a log maintained on hard disk drive 5b. Thereafter, the logic flow proceeds to logic step 526 where the status is reported to the user via display device 4. After the user is informed of the status at logic step 526, the logic flow process exits back to the computer operating system at logic step 504.

If a operation complete status and secret session encryption key are received from the token system 300 at logic step 502 of FIG. 13a, however, the logic flow process will proceed to logic step 505 to look up the answering system ID in RAM 1d of FIG. 5, and to determine if there is a current encryption key associated with the answering system ID. If the answering system ID is found to have a current encryption key, the logic flow process branches to logic step 506 where the token system ID stored in RAM 1d is encrypted by using the current encryption key. From logic step 506, the logic flow process continues to logic step 507 where an access request and encrypted token ID are sent to the answering system by way of node I. If the answering system ID is not found to have an associated encryption key at logic step 505, however, the token system ID is concatenated with a request for access in cleartext at logic step 508.

At logic step 507, the concatenated information is transmitted to the answering system 11 by way of node I.

From logic step 507, the logic flow process proceeds to logic step 509a, where the originating system 10 awaits the response of the answering system 11 by way of a node J. If no response is received before the expiration of a predetermined time period, the logic flow process branches to logic step 510 where the error message "I/O Timed Out" is reported. Thereafter, the logic flow process proceeds to node L to exit the process as previously discussed. If a response is received from the answering system 11 before an I/O time-out occurs at logic step 509a, however, the logic flow process continues to logic step 509b, where a determination is made as to whether a prior pass through the authentication process has occurred. If not, the logic flow process enters logic step 511. If a prior authentication process has occurred, however, the logic flow process proceeds to logic step 509c and the answering system response is decrypted to provide the answering system ID. From logic step 509c, the logic flow proceeds to logic step 511 where the answering system ID is compared to the expected answering system ID. If a match occurs, an acknowledgment of the match is generated at logic step 513 and sent to the answering system 11 by way of a node K. From logic step 513 the logic flow process proceeds to logic step 514, where the secret session encryption key received from the token system 300 at logic step 502 is copied to RAM 1d and to the encryption engine. Thereafter, the logic flow continues through node M to logic step 515 of FIG. 13b.

From this point of the logic flow process to the completion of the system connection, all exchanges between the originating system 10 and the answering system 11 are encrypted.

If no match occurs at logic step 511 and the answering system 11's ID is not recognized, the logic flow process branches to logic step 512, where an error message "System Not Recognized" is reported. Thereafter, the logic flow process proceeds through node L to FIG. 13b to continue as previously discussed.

At logic step 515 of FIG. 13b, the response from the answering system by way of node O is awaited. If no response is received before an I/O time-out occurs, the logic flow process continues to logic step 516 where the error messages "I/O Timed Out" or "ID Unknown" are reported, and then proceeds to logic step 525 as previously described. If a response is received at logic step 515 before the I/O time-out occurs, however, the logic flow process moves to logic step 517. There, the originating system 10 decrypts the answering system's reply, and sends both a "Verify Password" command and the answering system password to the token system 300 by way of connecting node AC.

From logic step 517, the logic flow process continues to logic step 518 to await a response from the token system 300, by way of node AD, which indicates that the answering system is either authenticated or not authenticated. If the reply is not received before an I/O time-out occurs, the logic flow process branches to logic step 519 where the error message "I/O Timed Out" is reported. Additionally, error conditions such as "Token Not Activated", "ID Unknown", and "Password Failed" are reported if they occur. From logic step 519, the logic flow process continues as previously described.

If a response is received at logic step 518 which indicates that the answering system is authenticated, however, the logic flow process continues to logic step 520, where the originating system encrypts not only the token reply received at logic step 518, but also other authentication information which may have been requested. Such other authentication information may include, but not be limited to, the originating system ID, a user password, or secrets known exclusively by the originating and answering systems. The encrypted information then is transmitted to the answering system by way of node P, and the logic process thereafter continues from logic step 520 to logic step 521 to await the answering system reply by way of node Q.

If a reply is not received from the answering system before an I/O time-out occurs, the logic flow process branches to logic step 522 to report the error message "I/O Timed Out". Additional error conditions which could occur such as "Token ID Unknown", "Token Not Authorized With Originating System", and "Password Failed" also are reported. From logic step 522, the logic flow process proceeds to logic step 525 and continues as previously described.

If an answering system reply is received at logic step 521 before an I/O time-out occurs, however, the logic flow process proceeds to logic step 523 to determine whether the answering system 11 has requested another authentication cycle. If so, the logic flow process loops back through node N to logic step 501 of FIG. 13a to perform as before described. If not, with authentication being satisfied, the logic flow process continues from logic step 523 of FIG. 13b to logic step 524 to exchange encrypted information with the answering system 11 and perform other desired operations. From logic step 524, the logic flow process exits to the originating system's operating system at logic step 504.

Figure 14A:
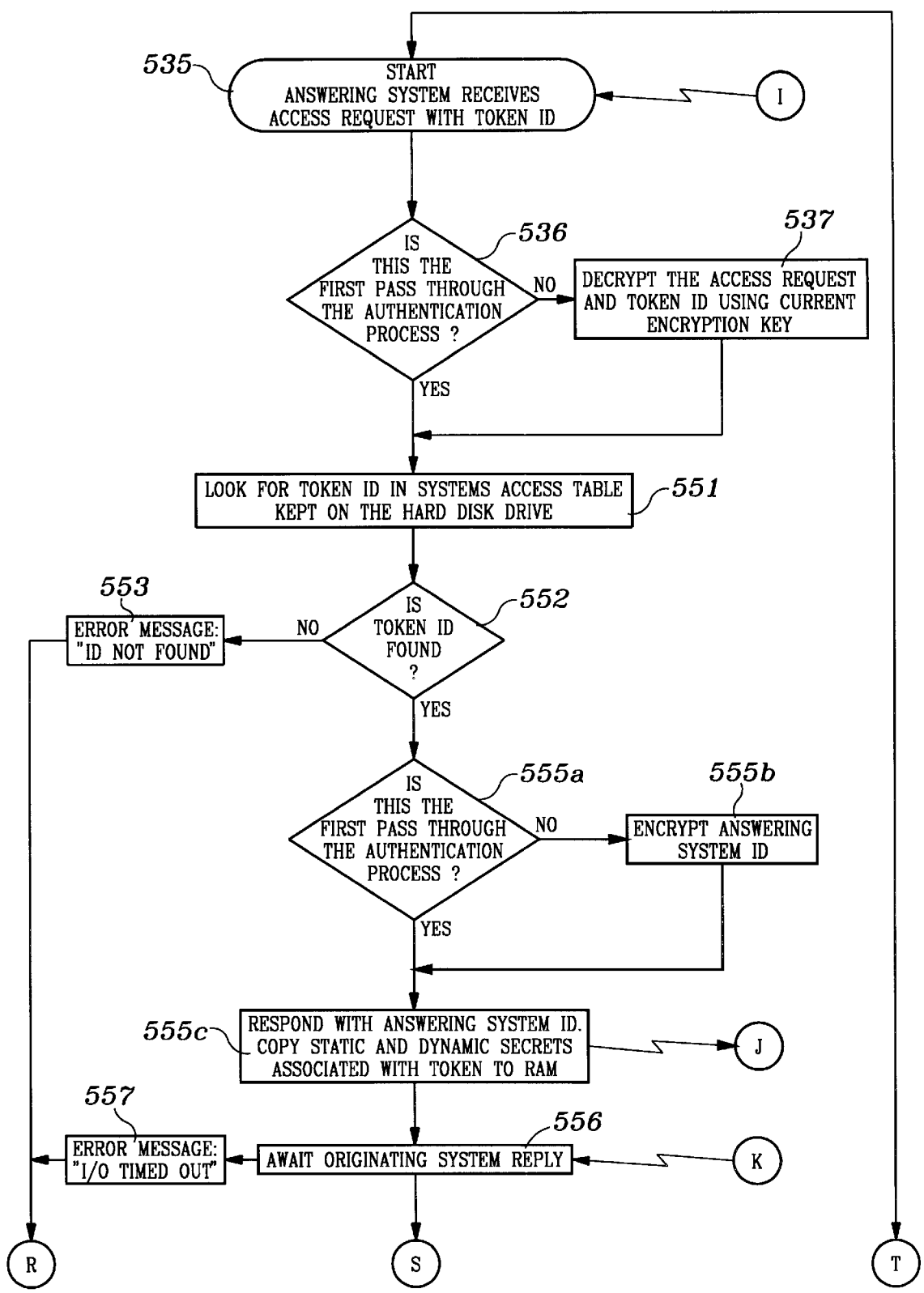
FIGS. 14a, 14b, and 14c are logic flow diagrams of the application software executed by the answering system without a token system as illustrated in FIG. 5.
Figure 14B:
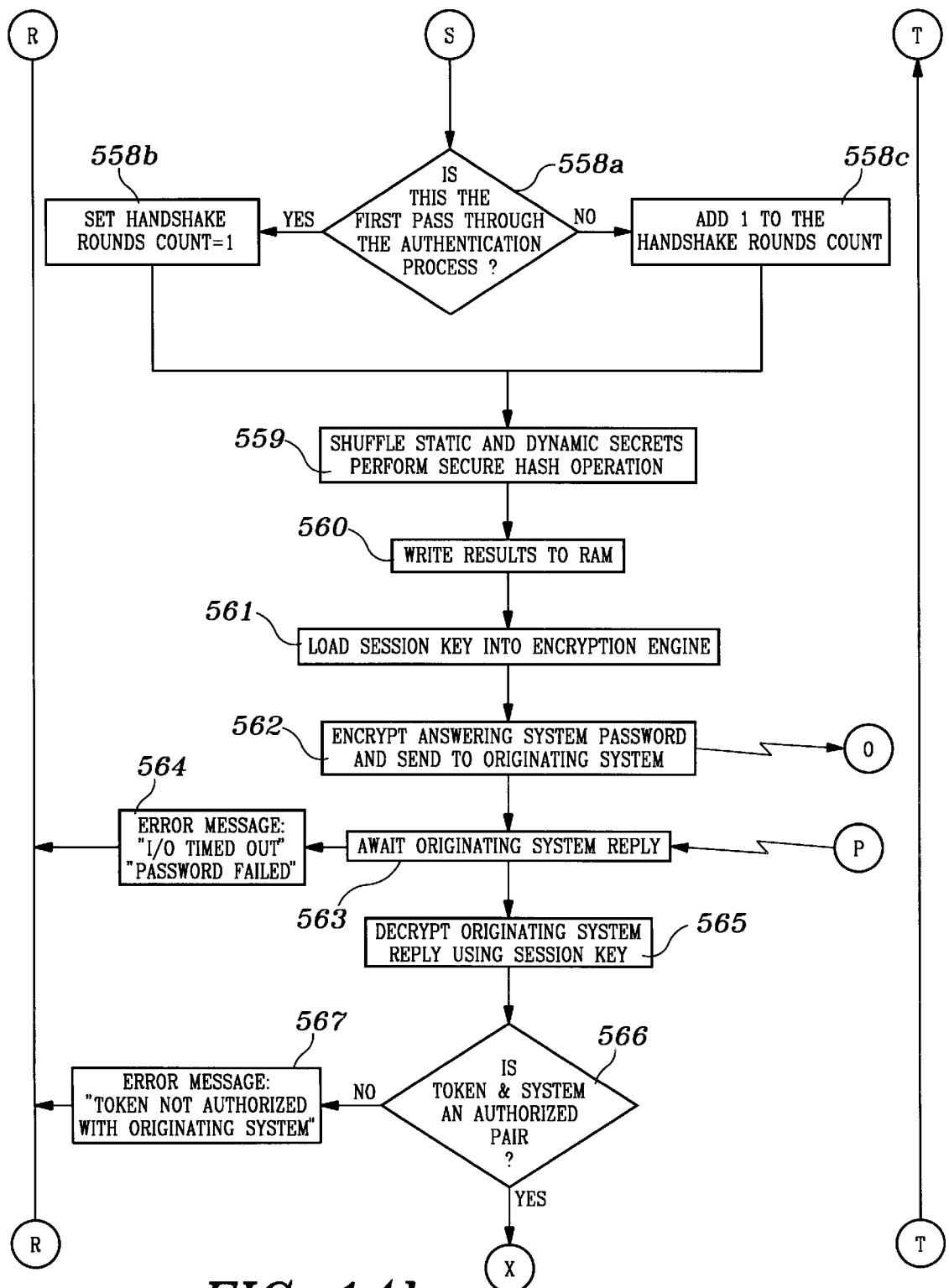

FIGS. 14a and 14b are logic flow diagrams of the operation of the answering system 11 during an authentication verification and encrypted message exchange between the answering system 11, and the token system 300 by way of the originating system 10. It is to be understood that a token system may be used for either or both the originating system 10 and the answering system 11. For purposes of this description, the token system is connected to the originating system 10.

Figure 14C:
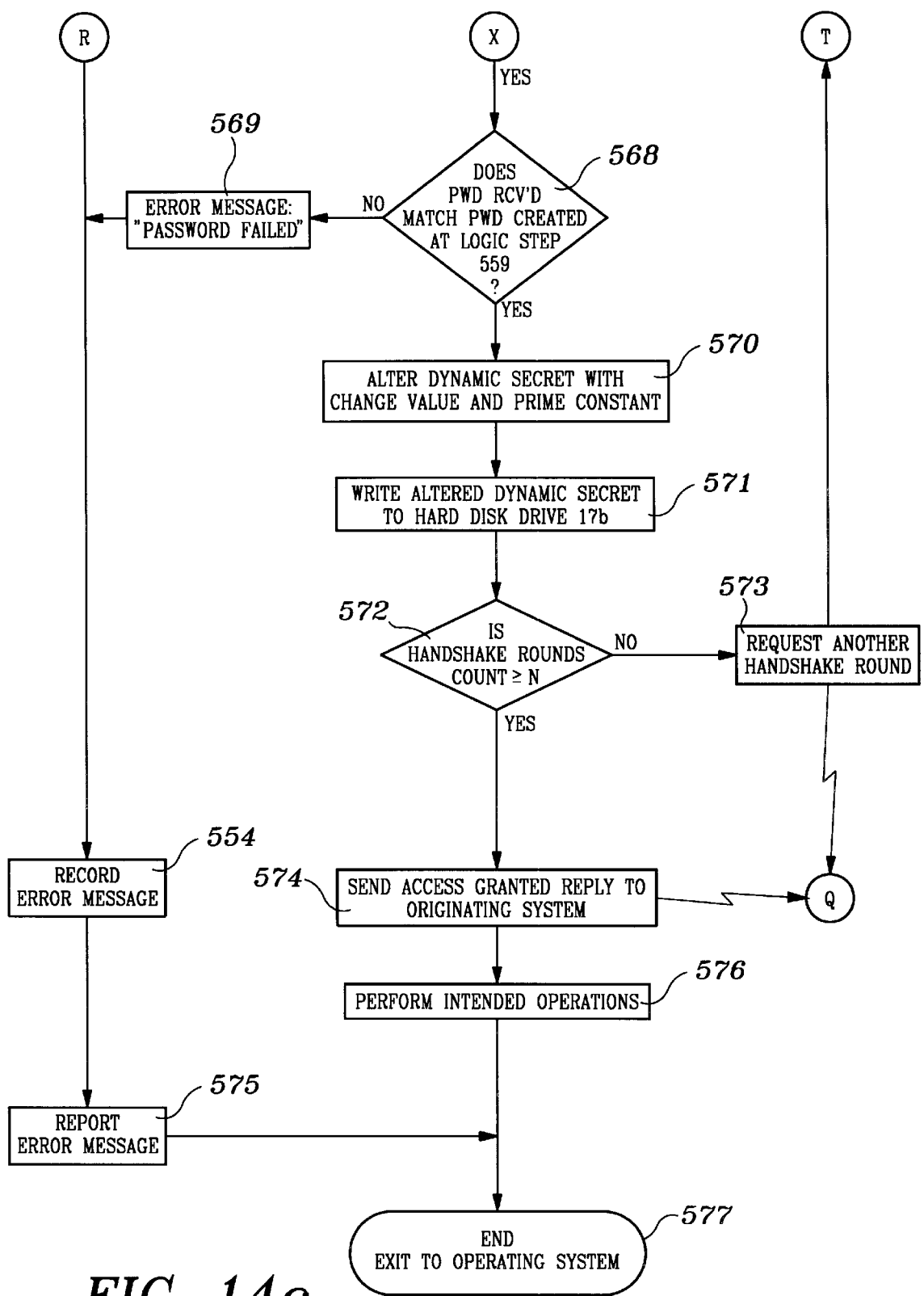

Referring to logic step 535 of FIG. 14a, the answering system 11 receives a request for access from the originating system 10 by way of node I. At logic step 536, a determination is made whether a token ID authentication has already occurred. If not, the logic flow process proceeds to logic step 537, where the access request and token ID are decrypted through use of a current encryption key associated with the token system ID stored in RAM 13c. From logic step 537, the logic flow continues to logic step 551. If a previous authentication has occurred at logic step 536, the logic flow process proceeds directly to logic step 551, where the answering system 11 looks for the token ID in the systems access table stored in hard disk drive 17b of FIG. 5. At logic step 552 of FIG. 14a, the answering system determines whether the token ID received as part of the request is one of the authorized IDs listed in the systems access table stored in hard disk drive 17b. If not, the logic flow process branches to logic step 553 to report the error message "ID Not Found", and thereafter continues by way of node R to logic step 554 of FIG. 14c where the error message is logged onto hard disk drive 17b. From logic step 554, the logic flow continues to logic step 575 where the error condition is reported back to the originating system for display to the operator via display device 4. From logic step 575, the logic flow process moves to logic step 577, where an exit back to the answering system's operating system occurs.

If the token ID is found to be authorized at logic step 552, the logic flow process continues to logic step 555a to again determine whether a prior authentication cycle has occurred. If so, the logic flow process jumps from logic step 555a to logic step 555b, where the answering system ID is encrypted with the current encryption key of logic step 537. From logic step 555b, the logic flow continues to logic step 555c. Further, if a prior authentication cycle has not occurred at logic step 555a, the logic flow process moves directly to logic step 555c, where the answering system ID is transmitted to the originating system 10 by way of node J. The answering system further stores the static and dynamic secrets associated with the token ID in an active session table kept in RAM 13c of FIG. 5. From logic step 555c of FIG. 14a, the logic flow process continues to logic step 556 to await the originating system's reply. If a reply is not received before an I/O time-out, the logic flow process reports the error message "I/O Timed Out" at logic step 557, and thereafter proceeds via node R as before described. If a reply is received by way of node K before the I/O time-out occurs, the logic flow process continues from logic step 556, and through node S to logic step 558a where a determination is made as to whether a prior authentication cycle has occurred. If not, the logic flow process branches to logic step 558c to increase the count of a handshake rounds counter by one. The logic flow process then continues to logic step 559 where static and dynamic secrets are found in the active session table in RAM 13c by using the token ID as a tag. The static and dynamic secrets thereafter are combined by a mathematical and/or logic function to shuffle bits and perform a many-to-few bit mapping by wrapping the smaller input repeatedly into the larger input until all bits of the larger input are processed. The pseudo-random result thereafter is applied to a secure hash operation which performs a second many-to-few bit mapping to produce a pseudo-random message digest.

If a prior authentication cycle has occurred at logic step 558a, the logic flow moves to logic step 558b where the count of the handshake rounds counter is set to one. Thereafter, the logic flow process proceeds to logic step 559.

From logic step 559, the logic flow process continues to logic step 560 where the originating system password 25, answering system password 26, secret session encryption key 27, and change value 28 are extracted from the message digest, and written along with the token ID into the active session table of RAM 13c. Thereafter at logic step 561, the secret session encryption key 27 created at logic step 559 is loaded into the before described encryption engine. At logic step 562 the answering system password is encrypted by using the secret session encryption key 27, and transmitted by way of node O to the originating system of FIG. 13b.

From logic step 562 of FIG. 14a, the logic flow process proceeds to logic step 563 to await an originating system reply via node P which indicates that the answering system password is authenticated. If the reply is not received before an I/O time-out occurs, the logic flow process proceeds to logic step 564 to report the error message "I/O Timed Out", and then continues through node R as before described. A second error condition which can be reported at logic step 564 is "Password Failed". If the reply is received before an I/O time-out occurs, however, the logic flow process continues from logic step 563 to logic step 565 where the originating system reply is decrypted by using the secret session encryption key 27. Thereafter, at logic step 566 a determination is made whether the token system 300 and the originating system 10 are an authorized pair. If not, the logic flow process branches to logic step 567 to report the error message "Token Not Authorized with Originating System", and then proceeds through node R as before described. If the token and originating system are authorized as a pair, however, the logic flow process proceeds through node X to logic step 568 of FIG. 14c.

At logic step 568, a determination is made as to whether the password received from the originating system 10 matches that created at logic step 559 of FIG. 14b. If not, the logic flow process reports the error message "Password Failed" at logic step 569, and thereafter proceeds as previously described.

If a match occurs at logic step 568, however, the logic flow process continues to logic step 570, where the dynamic secret created at logic step 559 is altered by a prime constant and the change value 28 that was created at logic step 559. From logic step 570, the logic flow process proceeds to logic step 571, where the newly altered dynamic secret is written to the secrets table recorded on hard disk drive 17b. From logic step 571, the logic flow process continues to logic step 572, where it is determined whether the number of handshake rounds that have occurred is greater than or equal to a predetermined number n. If the rounds count is less than n, the logic flow process branches to logic step 573 to request another authentication cycle, and then cycles back through node T to logic step 535 to continue as before described. The answering system 11 also sends a request to perform another handshake round to the originating system 10 by way of communication node Q leading to logic step 521 of FIG. 13b.

If the handshake rounds count is equal to or greater than the number n, however, the logic flow process proceeds from logic step 572 to logic step 574 where an access granted signal is generated by the answering system 11 and supplied by way of node Q to the originating system 10.

From logic step 574, the logic flow process proceeds to logic step 576 to perform intended operations and information exchanges between the originating system 10 and the answering system 11. From logic steps 575 or 576, the logic flow process continues to logic step 577 to exit to the answering system's operating system.

From the above descriptions, it now should be evident that after a cleartext access request and exchange of identifiers, all exchanges between the two computer systems are thereafter in ciphertext. That is, the exchange is encrypted. Further, while the static secret and the initial dynamic secret are known by the token system 300 and the answering system 11, the secrets are never exposed to either the originating system 10 or any public communication link. The originating and answering systems demonstrate through their interaction a knowledge of the secrets, but the secrets are never revealed by one system to the other. In addition, the passwords, change value, and secret session encryption key are used during only a single system connection. The dynamic secret is updated by a non-predictable, pseudo-random change value after each system connection, thus causing the message digest output of the Secure Hash Algorithm to change substantially from one pseudo-random number to another pseudo-random number. Further, the static secret and dynamic secret inputs to the Secure Hash Algorithm are first bit-shuffled and subjected to a first many-to-few bit mapping prior to the hash generation, and the result is thereafter subjected to a second many-to-few bit mapping during the secure hash operation. Thus, any likelihood of the static secret or the current dynamic secret being discovered through either cryptographic analysis or brute force trial-and-error attack becomes prohibitive in time and cost.

The above attributes of the disclosed embodiments provide a high resistance against playback attacks and discovery of each piece of information that is required before the communicating systems can commence authentication. Once a system connection is completed, all components of an authentication exchange (originating system password, answering system password, session encryption key, and change value) are changed to new non-recurring values having no known relationship to the previous values. Thus, an attempt by an attacker to impersonate an originating or answering system, and use information previously generated, is prevented. Further, a would be attacker, even with possession of a token system, will not know the ID of the host system with which the token system is to be used, the answering system ID, or the token actuator code. If the token system is tamper resistant, wherein its contents are destroyed if an attempt to break the token system open is made, the would be attacker would have no access to either the static secret and dynamic secret inputs, or the message digest outputs of the encryption key generator embodied in the token system. Thus, impersonation becomes impossible.

Further security in the above described systems may be achieved through modifications to the message digest generation process illustrated in FIG. 2. For example, referring to FIG. 15, instead of a static secret and a dynamic secret, two different plural bit dynamic secrets 600 and 601 are applied to the inputs of a bit shuffling generator 603, which employs a many-to-few bit mapping to produce a first pseudo-random result 604 that is divided into three sectors. The first sector is a change value 605 which may be used to alter the dynamic secret 600 upon completion of a system connection. The second sector is a change value 606 which may be used to alter the dynamic secret 601 upon completion of a system connection. The third sector is a carry forward pseudo-random result that is applied to the input of the secure hash generator 608, which produces the message digest 609. The message digest in turn is divided into four sectors as before described in connection with the description of FIG. 2, with the exception that one of the sectors is ID change value 610 that may be applied to alter the originating system ID and the answering system ID upon completion of a system connection to provide further protection against playback attacks. The other three sectors of the message digest 609 are the originating system one-time password 611, the answering system one-time password 612, and the secret session encryption key 613, whose functions have been previously described.

Figure 15:
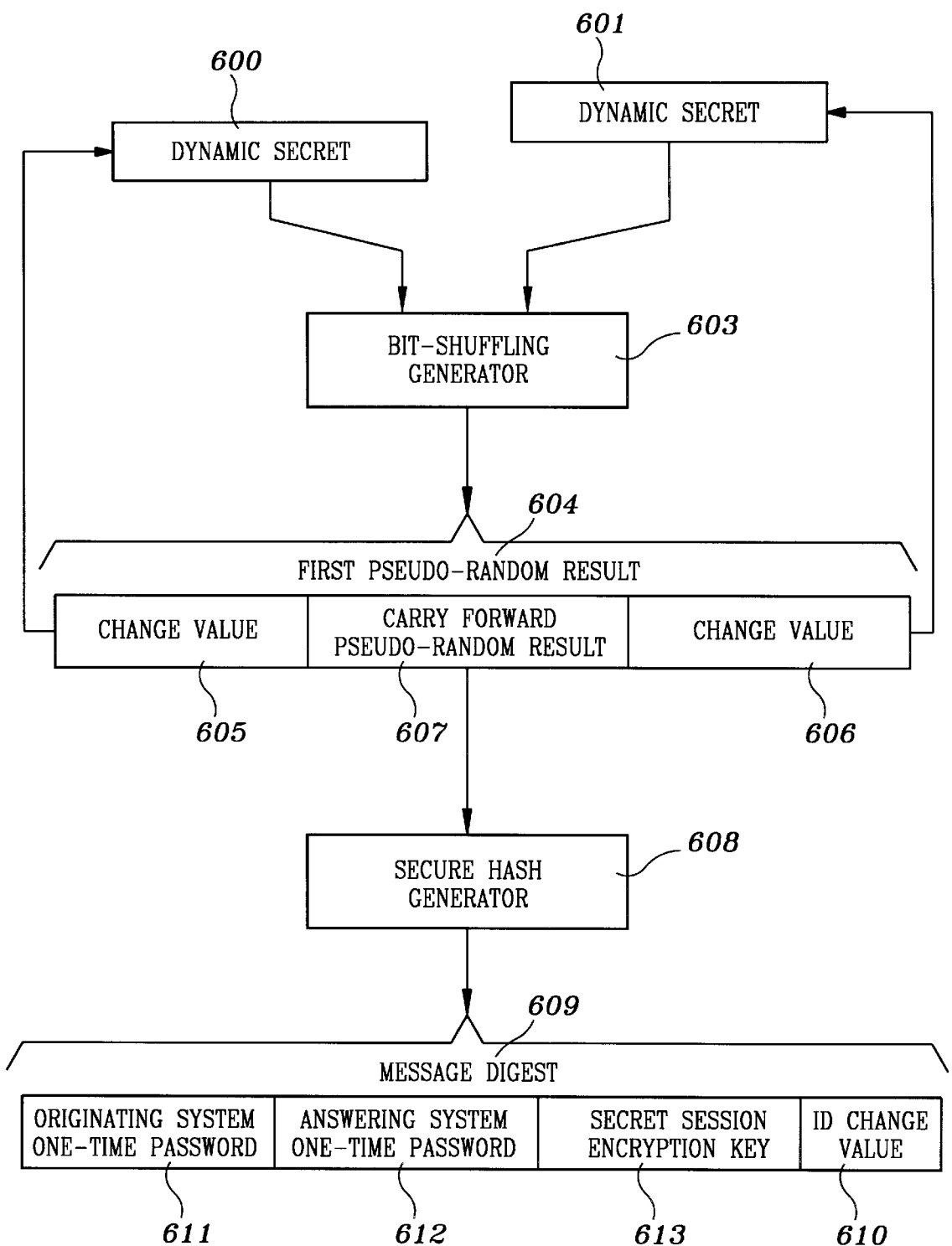
FIG. 15 is a graphic illustration of an alternative logic process for generating message digests.
Figure 16:
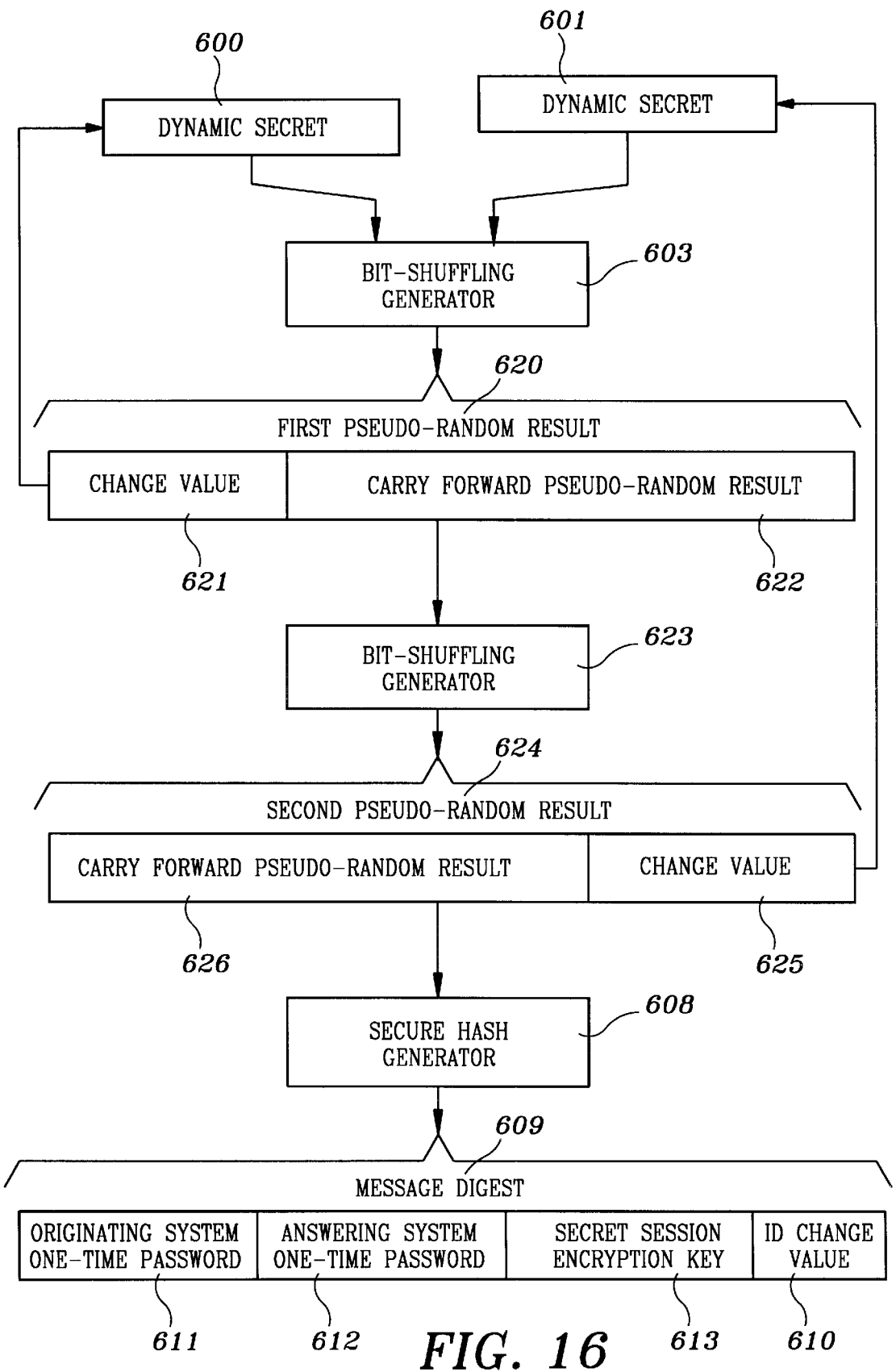
FIG. 16 is a graphic illustration of a variation of the logic process of FIG. 15.

A variation of the teachings of FIG. 15 may be seen in FIG. 16, where the first pseudo-random result 620 produced by the bit shuffling generator 603 is divided into only two sectors. The first sector is a change value 621 which may be used to alter the dynamic secret 600 upon completion of a system connection, and the second sector is a carry forward pseudo-random result 622 which is applied to a second bit shuffling generator 623 that performs a many-to-few bit mapping to produce a second pseudo-random result 624. The second pseudo-random result is divided into a carry forward pseudo-random result 626, and a change value 625 that is used to alter the dynamic secret 601 upon completion of a system connection.

The carry forward pseudo-random result 626 is applied as an input to the secure hash generator 608 to produce the message digest 609, as before described in connection with FIG. 15.

The present invention has been particularly shown and described in detail with reference to preferred embodiments, which are merely illustrative of the principles of the invention and are not to be taken as limitations to its scope. Further, it will be readily understood by those skilled in the art that numerous changes and modifications may be made without departing from the spirit of the invention. For example, the change value resulting from the generation of a message digest may be used to alter not only the dynamic secret, but also the system IDs. Further, instead of using a component of the message digest as a change value, the pseudo-random input to the secure hash generator could be used. As another example, the message digest could be split into more than four components, or less than four components with the pseudo-random input to the secure hash generator being used to provide those components not supplied by the message digest. In addition, the originating system and the answering system could use different components of the message digest as their respective encryption keys, and thus operate in a full duplex mode requiring twice the effort to penetrate both sides of an information exchange. In yet another example, multiple passes of the logic flow illustrated in FIG. 2 could be made to generate a message digest with encryption key components of ever increasing bit lengths. Still further, separate components of the pseudo-random input to the secure hash generator could be used to alter the static and dynamic secrets, thus making both secrets dynamic, while a message digest component could be used to alter system IDs. Also, two bit-shuffles could be used in the logic flow of FIG. 2, with a component of the pseudo-random output of the first bit shuffle being used to alter the static secret (now second dynamic secret), a component of the pseudo-random output of the second bit shuffle being used to alter the dynamic secret, and a component of the message digest being used to alter system IDs.

What is claimed is:

1. A network system for secure exchange of information, which comprises:

a token system having stored therein a token system ID, n answering system IDs, n static secrets, n dynamic secrets, a first many-to-few bit mapping program, and a second many-to-few bit mapping program, and having means for generating a pseudo-random message digest comprised of a first originating system password, a first answering system password, a session encryption key, and a change value by applying one of said n static secrets and one of said n dynamic secrets as inputs to said first many-to-few bit mapping program and applying results thereof as an input to said second many-to-few bit mapping program, for verifying authenticity of a first answering system ID by comparison with said n answering system IDs stored within said token system to gain a first match, and of a second answering system password by comparison with said first answering system password to gain a second match, and generating said pseudo-random message digest upon verification of authenticity of said first answering system ID, and altering said one of said n dynamic secrets with said change value upon verification of authenticity of said second answering system password;

an originating system in electrical communication with said token system and having stored therein an originating system ID, and said n answering system IDs, and having means for selecting said first answering system ID from said n answering system IDs and supplying said first answering system ID to said token system for a first authenticity verification, and upon receipt of said session encryption key from said token system, determining if a prior bilateral authentication has occurred, and if a prior bilateral authentication has not occurred, transmitting said token system ID and an access request, and if a prior bilateral authentication has occurred encrypting said token system ID with said session encryption key and transmitting an encrypted token system ID with said access request, receiving a second answering system ID, and if a prior bilateral authentication has not occurred verifying authenticity of said second answering system ID by comparing said second answering system ID with said first answering system ID, and if a prior bilateral authentication has occurred, receiving and decrypting an encrypted second answering system ID with said session encryption key to provide said second answering system ID for comparison with said first answering system ID, and upon an occurrence of a match transmitting an acknowledgment of authenticity, and upon receipt of an encrypted second answering system password, decrypting said encrypted second answering system password with said session encryption key and providing said second answering system password to said token system to compare with said first answering system password to gain said second match, and upon receiving an acknowledgment of authenticity of said second answering system password from said token system, encrypting said originating system password and said originating system ID to generate respectively an encrypted first originating system password and an encrypted originating system ID, and upon receiving an acknowledgment of authenticity of said first originating system password and an acknowledgment of authenticity of said token system and said originating system as an authorized pair, encrypting information with said session encryption key for transfer over said network system during a system connection;

communication link means in electrical communication with said originating system for accommodating information transfers over said network system; and an answering system in electrical communication with said communication link means and having stored therein n originating system IDs, n token system IDs, said second answering system ID, said n static secrets, said n dynamic secrets, said first many-to-few bit mapping program, said second many-to-few bit mapping program, and said means for generating said pseudo-random message digest comprised of a second originating system password, said second answering system password, said session encryption key, and said change value by applying said one of said n static secrets and said one of said n dynamic secrets as inputs to said first many-to-few bit mapping program and analyzing results thereof as an input to said second many-to-few bit mapping program, for receiving from said originating system by way of said communication link means said token system ID if a prior bilateral authentication of said token system ID has not occurred in said originating system, receiving said encrypted token system ID from said originating system by way of said communication link means if a prior bilateral authentication of said token system ID has occurred, decrypting said encrypted token system ID with said session encryption key upon receipt from said originating system over said communication link means, and upon verifying authenticity of said token system ID by comparing with said n token system IDs, determining if a prior bilateral authentication has occurred, and if a prior bilateral authentication has not occurred transmitting said second answering system ID to said originating system by way of said communication link means, and if a prior bilateral authentication has occurred encrypting said second answering system ID with said session encryption key to provide said encrypted second answering system ID over said communication link means to said originating system, and upon receiving an acknowledgment of verification of authenticity of said second answering system ID from said originating system over said communication link means, generating said pseudo-random message digest and encrypting said second answering system password with said session encryption key to send said second encrypted answering system password over said communication link means to said originating system, and upon receipt of said encrypted first originating system password and said encrypted originating system ID, decrypting said encrypted first originating system password and said encrypted originating system ID with said session encryption key to verify authenticity of said first originating system password by comparing said first originating system password with said second originating system password, and verifying authenticity of use of said token system with said originating system by comparing said originating system ID with said n originating system IDs to gain a match, and upon verification of authenticity of said first originating system password, and upon verification of authenticity of said token system and said originating system as an authorized pair, issuing an acknowledgment of authenticity over said communication link means to said originating system, and thereafter decrypting said information with said session encryption key for further use.

2. The network system of claim 1, wherein said token system is a tamper resistant security module.

3. The network system of claim 1, wherein said encryption key is a deterministic, non-predictable, pseudo-random and symmetric encryption key.

4. The network system of claim 1, wherein said first many-to-few bit mapping program is an algebraic function program.

5. The network system of claim 1, wherein said first many-to-few bit mapping program is a logic function program.

6. The network system of claim 1, wherein said first many-to-few bit mapping program is an encryption program.

7. The network system of claim 1, wherein said first many-to-few bit mapping program consists of plural bit shuffling programs.

8. The network system of claim 1, wherein said second many-to-few bit mapping program is a secure hash algorithm (SHA) function.

9. The network system of claim 1, wherein said second many-to-few bit mapping program is an encryption program.

10. The network system of claim 1, wherein said second many-to-few bit mapping program consists of plural encryption programs.

11. The network system of claim 1, wherein said token system ID, said answering system ID, and said originating system ID are altered by any component of said pseudo-random message digest at end of said system connection.

12. The network system of claim 1, wherein a binary length of each of said n dynamic secrets is different from that of each of said n static secrets.

13. The network system of claim 1, wherein said pseudo-random message digest also is generated upon a request being made by one of said originating system and said answering system to a second of said originating system and said answering system.

14. The network system of claim 1, wherein said originating system and said token system communicate by way of one of a wireless IR, a wireless RF, an inductive, a capacitive, an optical, an ultrasonic, and an electro-magnetic system.

15. The network system of claim 1, wherein said n token system IDs, said n answering system IDs, said n originating system IDs, said n static secrets, and said n dynamic secrets are stored on a removable non-volatile memory of said answering system and said originating system.

16. The network system of claim 1, wherein information other than said originating system ID, said answering system ID, said originating system password, and said answering system password are authenticated.

17. The network system of claim 1, wherein said answering system controls number of authentications which occur in said network system.

18. The network system of claim 1, wherein said originating system password, said answering system password, said change value, and said session encryption key are used during only a single system connection.

19. The network system of claim 1, wherein said originating system and said answering system each may transmit and receive said information, and each may encrypt and decrypt said information.

20. A method for bilateral authentication of an originating system in electrical communication with a token system, and an answering system in electrical communication with said originating system by way of a communication link, which comprises the steps of:

storing a token system ID, n answering system IDs, n static secrets, and n dynamic secrets in said token system;

storing an originating system ID and said n answering system IDs in said originating system, and storing a first answering system ID, n originating system IDs, n token system IDs, said n static secrets, and said n dynamic secrets in said answering system;

said token system receiving a second answering system ID from said originating system and verifying authenticity of said second answering system ID by comparing said second answering system ID with said n answering system IDs stored within said token system to gain a first match;

bilaterally authenticating said token system and said answering system by said token system transmitting said token system ID to said originating system, and said originating system transmitting said token system ID by way of said communication link to said answering system, said answering system verifying authenticity of said token system ID by comparing said token system ID with said n token system IDs to gain a second match, and said answering system transmitting said first answering system ID by way of said communication link to said originating system, said originating system verifying authenticity of said first answering system ID by comparing said first answering system ID with said second answering system ID to gain a third match;

said answering system and said token system independently combining one of said n static secrets and one of said n dynamic secrets by way of a bit-shuffling operation to produce a first pseudo random result;

said token system and said answering system independently applying a many-to-few bit mapping to said first pseudo random result to produce a second pseudo random result;

said token system and said answering system independently extracting an originating system password, an answering system password, an encryption key, and a change value from said second pseudo-random result;

bilaterally authenticating said originating system and said answering system by said originating system receiving said originating system password from said token system and encrypting said originating system ID and said originating system password with said encryption key to produce respectively an encrypted originating system ID and an encrypted originating system password, said answering system encrypting said answering system password with said encryption key to produce an encrypted answering system password, and said answering system transmitting said encrypted answering system password to said originating system by way of said communication link, said originating system decrypting said encrypted answering system password with said encryption key to produce a second answering system password, and transmitting said second answering system password to said token system, said token system verifying authenticity of said second answering system password by comparing said second answering system password with said answering system password produced by said token system to gain a fourth match, and said originating system transmitting said encrypted originating system ID and said encrypted originating system password by way of said communication link to said answering system, said answering system decrypting said encrypted originating system ID and said encrypted originating system password with said encryption key to produce respectively said originating system ID and a second originating system password, said answering system verifying authenticity of said originating system ID by comparing with said n originating system IDs to gain a fifth match and verifying authenticity of said second originating system password by comparing with said originating system password produced by said answering system to gain a sixth match;

said token system and said answering system independently altering said one of said n dynamic secrets upon successful completion of both of above bilaterally authenticating steps;

said answering system and said originating system exchanging information encrypted with said encryption key over said communication link to complete a task; and repeating all of above steps in event a new system connection between said originating system and said answering system is made.

21. The method set forth in claim 20, wherein both of the bilaterally authenticating steps occur at machine speeds of said originating system and said answering system.

22. The method of claim 20, wherein said token system is portable, readily carried on a person and tamper resistant.

23. The method of claim 20, wherein said bit-shuffling operation includes an algebraic or logic operation, and a many-to-few bit mapping.

24. The method of claim 20, wherein said many-to-few bit mapping is accomplished by said token system and said answering system applying a Secure Hash Algorithm to said first pseudo-random result.

25. The method of claim 20, wherein said bit shuffling operation is accomplished by executing an equation $A \oplus B$, where A is said one of said n static secrets and B is said one of said n dynamic secrets.

26. The method of claim 20, wherein said encryption key may be generated upon request after both of the bilaterally authenticating steps are performed.

27. The method of claim 20, wherein the step of altering said one of said n dynamic secrets is accomplished by combining a non-zero prime constant and said change value with said one of said n dynamic secrets.

28. The method of claim 27, wherein said second pseudo-random result is non-recurring and is used only once per system connection.

29. The method of claim 20, wherein the step of altering said one of said n dynamic secrets is accomplished by adding said change value to said one of said n dynamic secrets.

30. The method of claim 20, wherein said bit shuffling operation and said many-to-few bit mapping are cryptographic functions.

31. The method of claim 20, wherein a plurality of bit shuffling operations are applied to said one of said n dynamic secrets and said one of said n static secrets to produce said first pseudo-random result.

32. The method of claim 20, wherein a plurality of many-to-few bit mappings are applied to said second pseudo-random result.

33. The method of claim 20, wherein said encryption key is a deterministic, non-predictable, pseudo-random, and symmetric encryption key.

34. The method of claim 20 wherein said encryption key may be generated at any time upon request of either of said answering system and said originating system.

35. The method of claim 20, wherein last eight steps of said method are repeated at end of a system session.

36. The method of claim 20, wherein said static secret, said dynamic secret, said change value, and said encryption key at all times remain within said token system, said originating system, and said answering system without being shared over said communication link.

37. A method of authenticating an originating system, a token system, and an answering system, and protecting information to be exchanged over a communication link, with said token system and said answering system having a static secret and a dynamic secret, and said token system in communication with said originating system, and said originating system and said answering system in communication by way of said communication link, which comprises the steps of:

said originating system transmitting a token activation code to said token system;

said token system verifying said token activation code;

said token system transmitting a token system ID to said originating system;

said originating system transmitting a begin authentication command and a first answering system ID to said token system;

said token system verifying authenticity of said first answering system ID;

said token system transmitting a session encryption key to said originating system;

transmitting an access request and said token system ID from said originating system to said answering system;

verifying authenticity of said token system ID at said answering system;

transmitting a second answering system ID from said answering system to said originating system;

verifying authenticity of said second answering system ID by said originating system;

said originating system transmitting an acknowledgment of verification of said second answering system ID to said answering system;

said token system and said answering system independently combining said static secret and said dynamic secret with a first function to shuffle all bits in said static secret and said dynamic secret and perform a first many-to-few bit mapping to produce a first pseudo-random result;

said token system and said answering system independently hashing said first pseudo-random result with a secure hash algorithm (SHA) to perform a second many-to-few bit mapping to produce a second pseudo-random result;

said token system and said answering system independently extracting an originating system password, an answering system password, an encryption key, and a change value from said second pseudo-random result;

encrypting said answering system password with said encryption key by said answering system to generate a first encrypted password;

transmitting said first encrypted password by said answering system to said originating system;

receiving said encryption key from said token system and decrypting said first encrypted password with said encryption key by said originating system to produce a second answering system password;

transmitting said second answering system password to said token system by said originating system;

verifying authenticity of said second answering system password by said token system;

said originating system receiving said originating system password from said token system and encrypting said originating system ID and said originating system password with said encryption key by said originating system to generate respectively an encrypted originating system ID and a second encrypted password;

transmitting said encrypted originating system ID and said second encrypted password to said answering system by said originating system;

decrypting said encrypted originating system ID and said second encrypted password with said encryption key to produce respectively said originating system ID and a second originating system password and verifying authenticity of said originating system ID and said second originating system password by said answering system, thereby verifying combination of said token system and said originating system as an authorized pair;

transmitting an access granted signal by said answering system to said originating system;

said token system and said answering system independently altering said dynamic secret with said change value to produce a second dynamic secret;

said originating system encrypting information to be sent by said originating system to said answering system, and decrypting information received by said originating system from said answering system until all sessions of a system connection between said originating system and said answering system are completed;

said answering system encrypting information to be sent by said answering system to said originating system, and decrypting information received by said answering system from said originating system until all sessions of a system connection between said originating system and said answering system are completed; and repeating all of the above steps in event a new system connection between said originating system and said answering system is made.

38. The method of claim 37, wherein said token system ID, said answering system ID, and said originating system ID are altered by a component of said second pseudo-random result upon completion of said system connection.

39. The method of claim 37, wherein said token system ID and said answering system ID are altered by a component of said second pseudo-random result upon completion of said system connection.

40. The method of claim 37, wherein a component of said first pseudo-random result is used to alter said static secret and said dynamic secret, and a component of said second pseudo-random result is used to alter said token system ID, said answering system ID, and said originating system ID.

41. The method of claim 37, wherein the step of said token system and said answering system independently combining, and the step of said token system and said answering system independently hashing are repeated to increase a bit length of said second pseudo-random result.

42. A method of securing information exchanged over a communication link between an answering system, and an originating system in electrical communication with a token system, which comprises the steps of:

said token system verifying authenticity of a first answering system ID received from said originating system, said originating system verifying authenticity of a second answering system ID received from said answering system by way of said communication link, and said answering system verifying authenticity of a token system ID received from said token system by way of said originating system and said communication link;

said token system and said answering system independently creating a pseudo-random message digest, and independently extracting from said pseudo-random message digest an encryption key, an originating system password, an answering system password, and a change value;

said originating system receiving an encrypted answering system password from said answering system by way of said communication link, and said encryption key and said originating system password from said token system, using said encryption key to decrypt said encrypted answering system password to produce a second answering system password which is provided to said token system, and to encrypt an originating system ID and said originating system password to provide respectively an encrypted originating system ID and an encrypted originating system password that are sent by way of said communication link to said answering system;

said token system verifying authenticity of said second answering system password;

said answering system receiving said encrypted originating system ID and said encrypted originating system password from said originating system by way of said communication link, using said encryption key to decrypt said encrypted originating system ID and said encrypted originating system password to produce respectively said originating system ID and a second originating system password, and to encrypt said answering system password created by said answering system to produce said encrypted answering system password, and verifying authenticity of said originating system ID, said second originating system password, and use of said token system in combination with said originating system; and said answering system and said originating system using said encryption key to encrypt and decrypt said information exchanged over said communication link.

43. The method of claim 42 wherein said encryption key also is pseudo-random, symmetric, deterministic, and non-predictable.

44. The method of claim 42, wherein said method is a single sign-on method.

45. The method of claim 42, wherein said pseudo-random message digest is created by said token system and said answering system independently bit-shuffling a static secret and a dynamic secret, and performing a many-to-few bit mapping to produce a pseudo-random result, and thereupon performing a second many-to-few bit mapping on said result.

46. The method of claim 45, wherein said second many-to-few bit mapping is accomplished by said token system and said answering system independently applying a Secure Hash Algorithm to said result.

* * * * *

UNITED STATES PATENT AND TRADEMARK OFFICE
CERTIFICATE OF CORRECTION

PATENT NO. : 5,995,624
DATED : Nov. 30, 1999
INVENTOR(S) : Guy L. Fielder, Paul N. Alito It is certified that error appears in the above-indentified patent and that said Letters Patent is hereby corrected as shown below:

```
Col. 8, line 8, change "ED" to "ID".
Col. 18, line 48, after "authentication has",
         add "not".
Col. 19, line 22, after "If", delete "not", and
         substitute therefore "true".
Col. 19, line 35, after "cycle has", add "not".
Col. 23, line 49, change "analyzing" to "applying".
```

Signed and Sealed this

Thirteenth Day of March, 2001

Attest:

NICHOLAS P. GODICI

*Attesting Officer*     *Acting Director of the United States Patent and Trademark Office*